(12) United States Patent
Hornberger et al.

(10) Patent No.: US 6,970,093 B1
(45) Date of Patent: Nov. 29, 2005

(54) METHOD FOR CONFIGURING THE ALARM DEVICE OF AN ELECTRICAL MOTOR AND MOTOR FOR IMPLEMENTING SAID METHOD

(75) Inventors: Jöerg Hornberger, Dornstetten (DE); Frank Jeske, St. Georgen (DE); Hermann Rappenecker, Vohrenback (DE); Hansjörg Kaltenbrunner, Braeunlingen (DE); Arno Karwath, Rottweil (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 09/958,044

(22) PCT Filed: May 23, 2000

(86) PCT No.: PCT/EP00/04683

§ 371 (c)(1),
(2), (4) Date: Oct. 2, 2001

(87) PCT Pub. No.: WO00/74226

PCT Pub. Date: Dec. 7, 2000

(30) Foreign Application Priority Data

May 29, 1999 (DE) .............................. 199 24 821

(51) Int. Cl.[7] .............................................. B60Q 1/00
(52) U.S. Cl. ...................... 340/648; 340/438; 340/439
(58) Field of Search ............................ 340/648, 425.5, 340/438, 439; 701/115, 29, 30

(56) References Cited

U.S. PATENT DOCUMENTS

| 3,873,897 | A | | 3/1975 | Müller ....................... 318/138 |
|---|---|---|---|---|
| 4,296,409 | A | * | 10/1981 | Whitaker et al. ........... 340/684 |
| 5,017,846 | A | | 5/1991 | Young et al. ................ 318/244 |
| 5,121,291 | A | | 6/1992 | Cope et al. .................. 361/384 |
| 5,491,978 | A | | 2/1996 | Young et al. ................. 62/126 |
| 5,767,649 | A | | 6/1998 | Arimoto et al. ............ 318/570 |
| 5,845,045 | A | | 12/1998 | Jeske et al. ................. 388/804 |
| 5,941,918 | A | * | 8/1999 | Blosser ........................ 701/29 |

(Continued)

FOREIGN PATENT DOCUMENTS

DE      23 46 381 A1    11/1974

(Continued)

OTHER PUBLICATIONS

Patent Abstracts of Japan, vol. 1995, No. 10, abstracting JP 07-177 776-A, Morimoto+Morita+Tokoroya+Sesato/Matshushita, publ. Jul. 14, 1995, entitled Parameter Setting Apparatus of Motor Controller.

(Continued)

*Primary Examiner*—Toan N. Pham
(74) *Attorney, Agent, or Firm*—Milton Oliver, Esq.; Ware Fressola Van Der Sluys & Adolphson LLP

(57) ABSTRACT

If a motor becomes defective, e.g. stops running, runs too slowly, or becomes too hot, many customers demand the generation of an alarm signal, i.e. ask for an alarm device provided on the motor. The following method is used for configuring this alarm signal: At least one parameter for configuring the alarm device of the motor is inputted via a input interface (80, 82); the at least one parameter is stored in a parameter memory (74; 109); the execution of at least one routine of the alarm device provided in the microprocessor (23) is influenced by said stored parameter or by a parameter derived therefrom. The invention furthermore concerns a motor for carrying out such a method. In a motor of this kind, the alarm device can easily be configured in accordance with a customer's present needs.

46 Claims, 18 Drawing Sheets

U.S. PATENT DOCUMENTS

| | | | |
|---|---|---|---|
| 5,977,733 A | 11/1999 | Chen | 318/434 |
| 6,072,387 A * | 6/2000 | Overbeck et al. | 340/438 |
| 6,208,536 B1 | 3/2001 | Boesche et al. | 363/37 |
| 6,700,479 B2 * | 3/2004 | Birchfield | 340/426.14 |

FOREIGN PATENT DOCUMENTS

| | | |
|---|---|---|
| DE | 43 30 823 C2 | 3/1995 |
| DE | 44 41 372 A | 6/1995 |
| DE | 195 39 395 A1 | 4/1997 |
| DE | 297 02 431 U | 2/1998 |
| DE | 196 41 713 A1 | 4/1998 |
| DE | 197 13 448 A1 | 10/1998 |
| DE | 197 25 074 A1 | 12/1998 |
| EP | 0 450 834 A2 | 10/1991 |
| EP | 0 895 345 | 2/1999 |
| EP | 0 910 150 A2 | 4/1999 |

OTHER PUBLICATIONS

Patent Abstracts of Japan, vol. 1999, No. 4, abstracting JP 11-027 949-A, Matsui+Miura+Tokoroya/Matsushita, publ. Jan. 29, 1999, entitled Inverter Device.

Derwent WPI English abstract of Jeske et al. DE 44 41 372-A1, indicating correspondence between EP 0 657 989, EP 0 895 345 and USP 5,845,045.

National Semiconductor Corp. Product Folder, "COPCJ842 8-Bit Microncontrollers with Multi-Input Wake-Up and Brown Out Detector," ©2001, 4 pages (Santa Clara CA 95050).

Atmel Corp, datasheet, "2-wire Serial EEPROM AT24CO2," Rev. 0180F-06/01, ©2001, 16 pp. (San Jose CA 95131).

* cited by examiner

| Index | | | | 111 |
|---|---|---|---|---|
| | 113 | 115 | 117 | |
| 0x08 | unsigned16 | R/W | AL_CONF | |
| 0x09 | unsigned16 | R/W | t_AL_min | |
| 0x0A | unsigned16 | R/W | t_AL_max | |
| 0x0B | unsigned8 | R/W | t_AL_REL_min | |
| 0x0C | unsigned8 | R/W | t_AL_REL_max | |
| 0x0D | unsigned8 | R/W | t_DEL_STARTUP | |
| 0x0F | unsigned8 | R/W | t_DEL_AL | |
| 0x10 | unsigned8 | R/W | T_AL | |
| 0x11 | unsigned8 | R/W | T_AL_HYST | |
| 0x12 | unsigned8 | R/W | T_NTC_SI | |
| 0x13 | unsigned8 | R/W | T_NTC_SS | |

Fig. 7A

AL_CONF        119

| Bit | | LOW | HIGH |
|---|---|---|---|
| 0 | AK_AL | OFF | ON |
| 1 | AK_LATCH | OFF | ON |
| 2 | AK_DEL_STARTUP | OFF | ON |
| 3 | AK_DEL | OFF | ON |
| 4 | AK_TTL | OFF | F->TTL |
| 5 | AK_SIG | F->LOW | F->HIGH |
| 6 | AK_TACHO | ALARM | TACHO |
| 7 | AK_IIC | OFF | F->IIC |
| 8 | AK_NTC | OFF | ON |
| 9 | AK_n | OFF | ON |
| 10 | AK_T | OFF | ON |
| 11 | AK_n_PERC | ABS | REL |
| 12 | AK_n_min | OFF | ON |
| 13 | AK_n_max | OFF | ON |
| 14-15 | RES | | |

Fig. 7B

AL_CTRL
121

| Bit | | LOW | HIGH |
|---|---|---|---|
| 0 | AC_LATCH | OFF | ON |
| 1 | AC_DEL_STARTUP | OFF | ON |
| 2 | AC_DEL | OFF | ON |
| 3 | AC_TTL | OFF | F -> TTL |
| 4 | AC_SIG | F -> LOW | F -> HIGH |
| 5 | AC_TACHO | OFF | ON |
| 6 | AC_IIC | OFF | F -> IIC |
| 7 | AC_NTC | OFF | ON |
| 8 | AC_n | OFF | ON |
| 9 | AC_T | OFF | ON |
| 10 | AC_AL | OFF | ON |
| 11-15 | RES | | |

Fig. 8

AL_STATE
123

| Bit | | LOW | HIGH |
|---|---|---|---|
| 0 | AS_LATCH_ON | OFF | ON |
| 1 | AS_TACHO_ON | OFF | ON |
| 2 | AS_NTC_ON | OFF | ON |
| 3 | AS_T_ON | OFF | ON |
| 4 | AS_n_ON | OFF | ON |
| 5 | AS_REQ | OFF | ON |
| 6 | AS_OUT | OFF | ON |
| 7 | RES | | |

Fig. 9

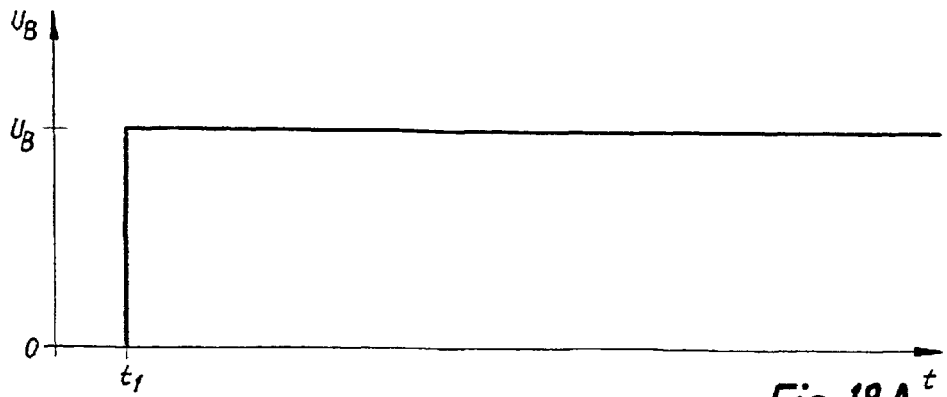
*Fig. 18A*
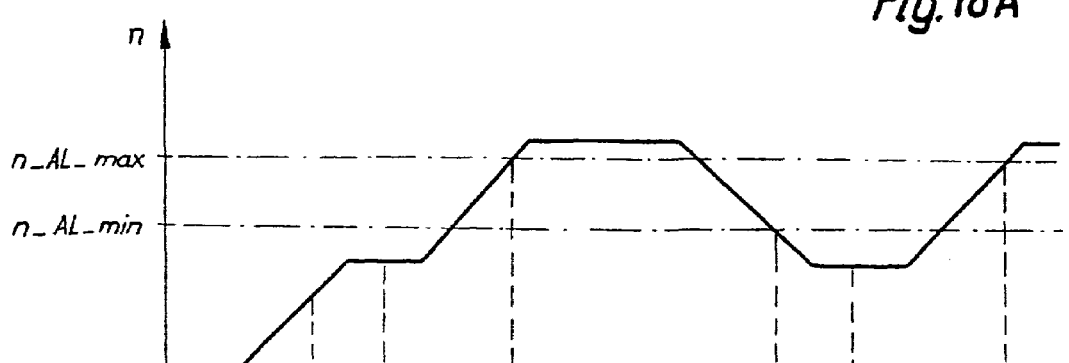
*Fig. 18B*
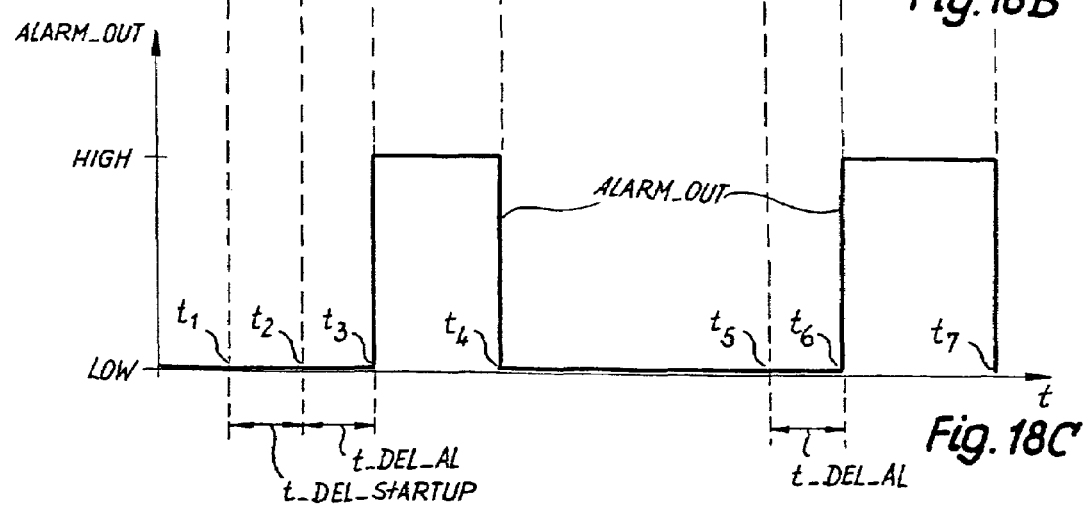
*Fig. 18C*
*Fig. 18*

US 6,970,093 B1

METHOD FOR CONFIGURING THE ALARM DEVICE OF AN ELECTRICAL MOTOR AND MOTOR FOR IMPLEMENTING SAID METHOD

FIELD OF THE INVENTION

The invention concerns a method for configuring the alarm device of an electric motor, and a motor for carrying out such a method.

BACKGROUND

EP 0 895 345 A1, corresponding to U.S. Pat. No. 5,845,045, discloses an electric motor having an alarm device (cf. FIG. 20 therein). This alarm device has little flexibility. If a customer demands changes, extensive modifications to the motor's hardware are often necessary in order to achieve them.

SUMMARY OF THE INVENTION

An object of the invention is to make available a method for configuring the alarm device of an electric motor, and a motor for carrying out such a method.

According to the invention, this object is achieved by means of a method for configuring an alarm device of an electric motor associated with which are a microcontroller or microprocessor (hereinafter called a microprocessor), an input interface, and a parameter memory, which method comprises the following steps: via the input interface, at least one parameter for configuring the alarm device of the motor is inputted; the at least one parameter is stored in the parameter memory; the execution of at least one routine of the alarm device that is provided in the microprocessor is influenced by said stored parameter or by a parameter derived therefrom.

A motor of this kind allows the alarm device to be configured using a variety of parameters, i.e. on a software basis, so that production does not need to be reconfigured if a customer's desires change. The customer can even acquire the capability of configuring the alarm device himself. In particular, a great variety of programs used in the microprocessor is thereby reduced to one single program for all the configurations possible with that motor, saving a great deal of time and expense. Any hardware configuration that may be present, e.g. by way of DIP switches, can also be eliminated. Because of the elimination of the time for reprogramming and hardware modifications, it is possible to react more quickly to customers' wishes, and to implement small production runs with particular customer requirements that would not previously have been worthwhile.

According to a preferred development of the invention for a motor having a nonvolatile memory associated with its microprocessor, the at least one parameter for configuring the alarm device is stored in said nonvolatile memory. A motor of this kind permits configuration of the alarm device prior to delivery to the customer but after completion of the motor. It is also possible for the manufacturer of the motor to perform configuration of the alarm device at a later time, e.g. in the delivery warehouse, but without offering the customer any capability for modifying the alarm device.

According to a further preferred development of this invention, several alternatives are provided for outputting the signal of the alarm device, and the desired alternative is defined in that at least one corresponding parameter is stored in the parameter memory via the input interface. This capability of selecting the output of the signal of the alarm device makes possible a further reduction in the number of motor types to be manufactured. For example, if one customer asks for an output interface A and another customer for an interface B, both interfaces A and B can be installed on the motor for the output of signals, and output to interface A or B can be configured by means of a corresponding configuration, i.e. the input of a corresponding parameter.

The aforesaid object is achieved in a different fashion by a method for operating an electronically commutated motor having associated with it a microprocessor or microcontroller (hereinafter simply called a microprocessor) and a nonvolatile memory, the microprocessor serving to execute a plurality of routines of differing priorities, having the following steps: a) if an error is ascertained upon execution of a diagnostic routine serving for error detection, a signal associated with that error is set; b) by means of an alarm monitoring routine serving to trigger an alarm, a check is made at intervals in time as to whether a signal associated with an error is set; c) if a signal is set, an alarm signal is generated in accordance with that signal and with at least one parameter which is stored in the nonvolatile memory or derived therefrom. The at least one parameter that is stored in the nonvolatile memory makes it much easier to adapt the alarm triggering operation to customers' individual needs.

The aforesaid object is achieved in a different fashion by an electric motor for carrying out a method as described below.

An electric motor of this kind preferably has associated with it a microcontroller or microprocessor (hereinafter simply called a microprocessor), also at least one diagnostic routine for sensing any error occurring during operation of the motor, and at least one alarm monitoring routine for triggering an alarm after a diagnostic routine has sensed an error, these routines constituting a component of the program of the microprocessor. The result is a simple and clearly organized program structure that is very well adapted to the requirements of a motor.

BRIEF FIGURE DESCRIPTION

Further details and advantageous developments of the invention are evident from the exemplary embodiments which are described hereinafter and depicted in the drawings, and which are in no way to be understood as a limitation of the invention. In the drawings:

FIG. 7A is a table with objects containing parameters with which the alarm device in motor 32 of FIG. 1 can be configured;

FIG. 7B is a table with the object properties of object AL_CONF of FIG. 7A, which determines the behavior of the "alarm" function;

FIG. 8 depicts control word AL_CTRL which is used to control the alarm functions as shown in FIG. 1;

FIG. 9 depicts status word AL_STATE which is used for storing and modifying the states of the alarm functions as shown in FIG. 1;

FIGS. 18A through 18C are diagrams of examples of curves for operating voltage $U_B$, rotation speed of motor 32, and alarm signal ALARM_OUT in a motor 32 according to the present invention;

DETAILED DESCRIPTION

Figure 1:
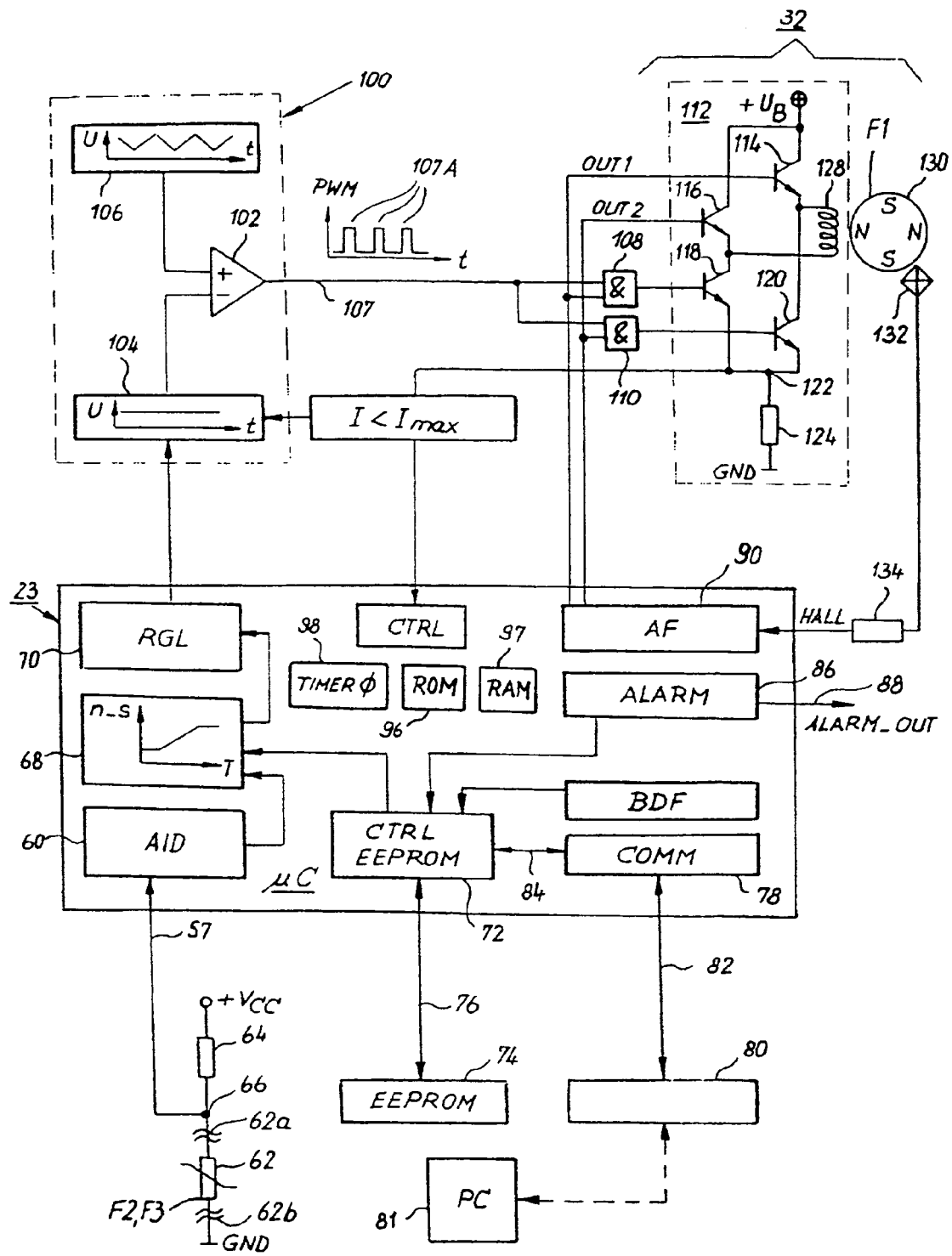
FIG. 1 is an overview circuit diagram of a preferred embodiment of an electronically commutated motor according to the present invention.

Motor Overview (FIG. 1)

FIG. 1 shows an overview of a preferred exemplary embodiment of an electronically commutated motor (ECM) according to the present invention. The latter is controlled by means of a microcontroller (μC) 23 or alternatively a microprocessor. μC 23 comprises an A/D converter 60, a "characteristic" function 68, an RGL (controller) function 70, a "CTRL EEPROM" function 72, a "COMM" (communication) function 78, an "ALARM" function 86, and an "AF" (drive) function 90. A/D converter 60 can also be arranged outside μC 23.

An NTC (Negative Temperature Coefficient) resistor 62 is connected between a node 66 and ground (GND), and a resistor 64 is present between a voltage Vcc (e.g. +5 V) and node 66. Node 66 is connected to A/D (Analog to Digital) converter 60.

An EEPROM 74 is connected via a bus 76 to "CTRL EEPROM" function 72. Instead of EEPROM 74, a flash ROM, a reprogrammable flex-ROM cell, or another nonvolatile memory could, for example, also be used. EEPROM 74, or another nonvolatile memory, can be integrated into μC 23.

μC 23 furthermore has a ROM 96, a RAM 97, and a timer 98 that is also referred to as TIMER0. ROM 96 is usually programmed together with the production of μC 23. It can also be arranged outside μC 23, as can RAM 97 and timer 98, as is known to those skilled in the art.

A bus terminal 80 is connected via a line 82 to "COMM" function 78.

"ALARM" function 86 can output a signal at output ALARM_OUT 88.

"RGL" function 70 is connected to a pulse-width modulation (PWM) generator 100. The PWM generator comprises a control voltage generator 104, a triangular generator 106, and a comparator 102, and is described in more detail with reference to FIG. 2. Through output 107 of PWM generator 100, a PWM signal passes to two logical AND elements 108, 110.

As a simple example, FIG. 1 depicts an electronically commutated motor 32 having a single phase 128. The principle of such a motor is explained, for example, in DE 23 46 380 C and corresponding U.S. Pat. No. 3,873,897. Motor 32 has a rotor 130, a Hall sensor 132, and a transistor output stage 112.

Transistor output stage 112 has four npn transistors 114, 15, 116, 118, and 120 connected as an H-bridge, and a resistor 124 for current measurement. The transistor output stage could, however, also be of two-phase configuration.

The signal of Hall sensor 132 passes via an electronic Hall circuit 134 to AF function 90.

"AF" function 90 controls two outputs OUT1, OUT2 that are connected to the upper npn transistors 114, 116 and to AND elements 108, 110.

Mode of Operation

Energization of phase 128 occurs through transistor output stage 112. Outputs OUT1, OUT2 control transistors 114, 116, 118, 120 connected as H-bridge 112. If OUT1 is HIGH and OUT2 is LOW, transistors 114 and 118 are conductive, and a current flows from operating voltage $+U_B$ through transistor 114, stator winding 128, transistor 118, and resistor 124 to ground GND. It is assumed in this context that signal PWM (line 107) is always HIGH, since otherwise AND elements 108, 110 and thus transistors 118, 120 are blocked.

If OUT1 is LOW and OUT2 is HIGH, a current flows from $+U_B$ through transistor 116, through stator winding 128 in the opposite direction, and through transistor 120 and resistor 124 to ground GND.

The alternating magnetic flux generated by stator winding 128 causes a torque on permanent-magnet rotor 130 and drives it. In this exemplary embodiment, rotor 130 is shown as having four poles.

The position of rotor 130 is sensed via Hall sensor 132. In circuit 134 its signal is filtered through a lowpass filter and processed into a square-wave digital signal HALL (FIG. 3) which is delivered to "AF" function 90.

"AF" function 90 controls outputs OUT1, OUT2 on the basis of signal HALL. In this example, commutation of motor 32 is accomplished electronically in known fashion (cf. for example EP 0 657 989 B1, corresponding to U.S. Pat. No. 5,845,045). "AF" function 90 moreover ensures correct commutation for reliable operation of motor 32, e.g. in the event of an overload of transistor output stage 112. Commutation can also be performed in such a way that transistors 114 through 120 are commutated earlier as the rotation speed increases, somewhat analogous to ignition advance in a gasoline engine.

The invention is, of course, similarly suitable for any type of motor, e.g. for two-phase or three-phase ECMs or others. This is therefore merely a simple exemplary embodiment intended to facilitate understanding of the invention.

Figure 2:
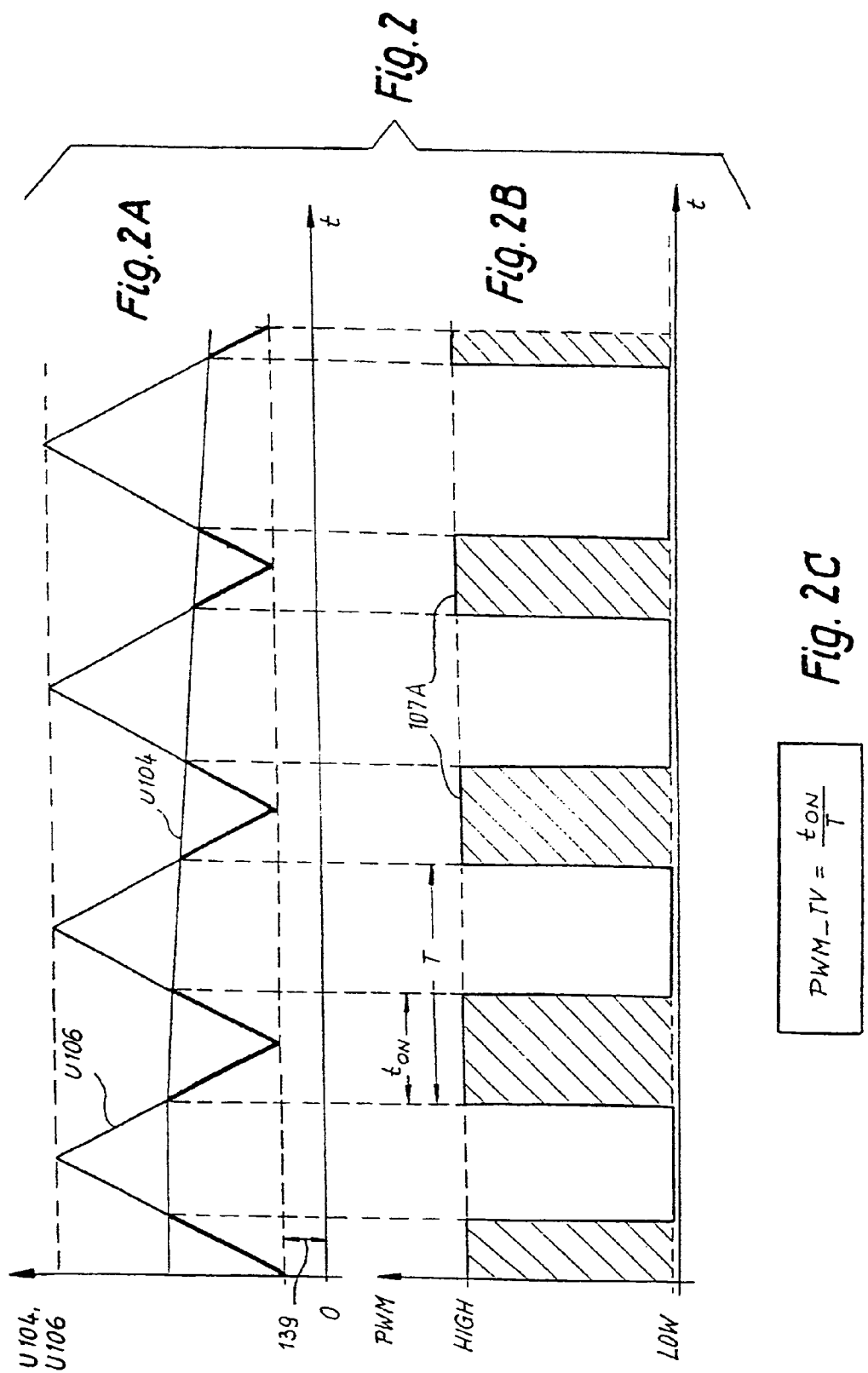
FIGS. 2A through 2C are schematic diagrams of the voltages and signals occurring in triangular signal generator 100 of FIG. 1.

In this exemplary embodiment, rotation speed control is achieved by controlling pulse duty factor PWM_TV of signal PWM at output 107 of controller 100, i.e. by making pulses 107A (FIG. 2) longer or shorter (see FIG. 2C for a definition of pulse duty factor PWM_TV). The greater this pulse duty factor, the longer pulses 107A become, and the longer the output of AND element 108 or 110 (currently being controlled by OUT1 or OUT2) is set to HIGH. Stator winding 128 is consequently energized for a longer time, and motor 32 is more vigorously driven. If, for example, OUT1 is HIGH and OUT2 is LOW, then upper transistor 114 is conductive and lower transistor 118 is switched on and off by AND element 108 in accordance with signal PWM.

In this exemplary embodiment, "RGL" function 70 controls the rotation speed n of motor 32 via PWM generator 100. For that purpose, "RGL" function 70 has available to it rotation speed n of rotor 130, which is calculated by way of signal HALL (see description of FIG. 3), and the rotation speed setpoint n_s, which in this exemplary embodiment is determined by "characteristic" function 68. Rotation speeds n and n_s can be present, for example, in the form of Hall times t_H (FIG. 3), for example in units of microseconds or seconds, or as a rotation speed, for example in units of rpm.

In this example, "characteristic" function 68 assigns to each temperature T (sensed by NTC resistor 62 of FIG. 1) a rotation speed setpoint n_s(T). The potential at node 66 (FIG. 1), which represents an indication of the temperature of resistor 62, is digitized by A/D converter 60 (located in $\mu$C 23) and delivered to "characteristic" function 68.

"Characteristic" function 68 determines, from temperature T, rotation speed setpoint n_s of motor 32. For this purpose, the value n_s(T) pertinent to the temperature T is loaded, for example via a "CTRL EEPROM" function 72, from a temperature/rotation speed setpoint table in EEPROM 74. Regarding a different preferred variant in which only vertices of a characteristic curve are stored and interpolation occurs between those vertices, to avoid unnecessary length the reader is referred to German Patent Application 198 36 882.8, corresponding to U.S. Ser. No. 09/720,221.

"COMM" function 78 manages bus terminal 80, through which data can be transmitted from outside into $\mu$C 23 and through which data can conversely be transmitted out from $\mu$C 23. For example, data that enter $\mu$C 23 via bus terminal 80 by means of "COMM" function 78 can be written, via connection 84 and with the aid of "CTRL EEPROM" function 72, into EEPROM 74.

Since reference will be made hereinafter to the motor rotation speed control system that is used in several embodiments of the invention, a rotation speed controller will be briefly explained. It is self-evident to those skilled in the art that there are a plurality of rotation speed controllers which can be used in the context of the invention, and that this is therefore only one example which is intended to facilitate understanding of the invention. The invention is in no way limited to this type of rotation speed control system, which instead represents a preferred exemplary embodiment.

PWM Generator

FIG. 2A shows a triangular signal $u_{106}$ of triangular generator 106 and a control output $u_{104}$ that is present at control voltage generator 104, FIG. 2B the signal PWM resulting from FIG. 2A, and FIG. 2C the calculation of pulse duty factor PWM_TV.

Triangular signal $u_{106}$ from triangular generator 106 is depicted in idealized fashion. In reality it does not have a perfect triangular shape, but this changes nothing in terms of the mode of operation of PWM generator 100 of FIG. 1. Triangular signal $u_{106}$ has an offset 139 from the 0 V voltage. Control output $u_{104}$ thus brings about a pulse duty factor PWM_TV greater than zero only when it is greater than offset 139.

Pulse duty factor PWM_TV of signal PWM is the ratio between the time $t_{ON}$ during which signal PWM is HIGH during one period of triangular signal $u_{106}$, and an entire period T of triangular signal $u_{106}$ (cf. FIG. 2B). The equation is as follows:

$$PWM\_TV = t_{ON}/T \qquad (1)$$

Pulse duty factor PWM_TV can be between 0% and 100%. For example, if the motor rotation speed is too high, control output $u_{104}$ is lowered and pulse duty factor PWM_TV is thus made smaller, as depicted in FIG. 2A in the plot over time. This is referred to as pulse-width modulation (PWM).

Figure 3:
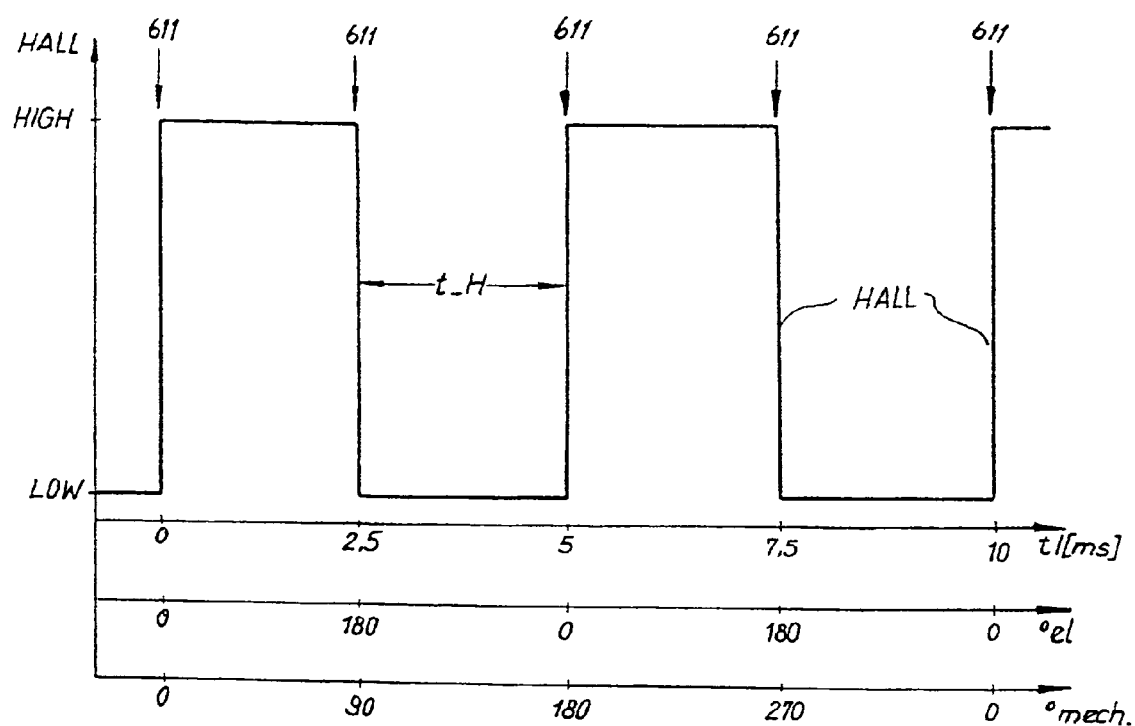
FIG. 3 is a schematic diagram of signal HALL detected by rotor position sensor 132 and transferred to µC 23 of FIG. 1.

FIG. 3 shows signal HALL which corresponds to the position of rotor 130 detected by Hall sensor 132 (FIG. 1) and is delivered to $\mu$C 23 via electronic Hall circuit 134 (FIG. 1).

Rotor 130 can have, for example, a rotation speed n=6000 rpm. One mechanical revolution of rotor 130 then lasts 10 ms. Rotor 130 is of four-pole configuration in this exemplary embodiment, so that four Hall changes take place in one mechanical revolution (360° mech.): two from HIGH to LOW and two from LOW to HIGH. One electrical revolution (360° elec.), on the other hand, is completed after only two Hall changes; in a four-pole motor, two electrical revolutions therefore take place for one mechanical revolution.

Rotation speed n is calculated from the Hall time t_H (FIG. 3) between two Hall changes:

$$t\_H = T/P \qquad (2)$$

in addition:

$$T = (60 \text{ seconds})/n \qquad (3)$$

From (2) and (3) it follows that $$t\_H = ((60 \text{ seconds})/n)/P \qquad (4)$$

where
T=duration of one mechanical revolution of rotor 130 (in seconds);
P=number of rotor poles (here P=4);
n=rotation speed (in rpm);

For n=6000 rpm and P=4, we calculate from (4):

$$t\_H = 60 \text{ s}/6000/4 = 2.5 \text{ ms.}$$

At a rotation speed of 6000 rpm, the time difference t_H between two changes in signal HALL is therefore 2.5 ms, as depicted by way of example in FIG. 3.

Figure 4:
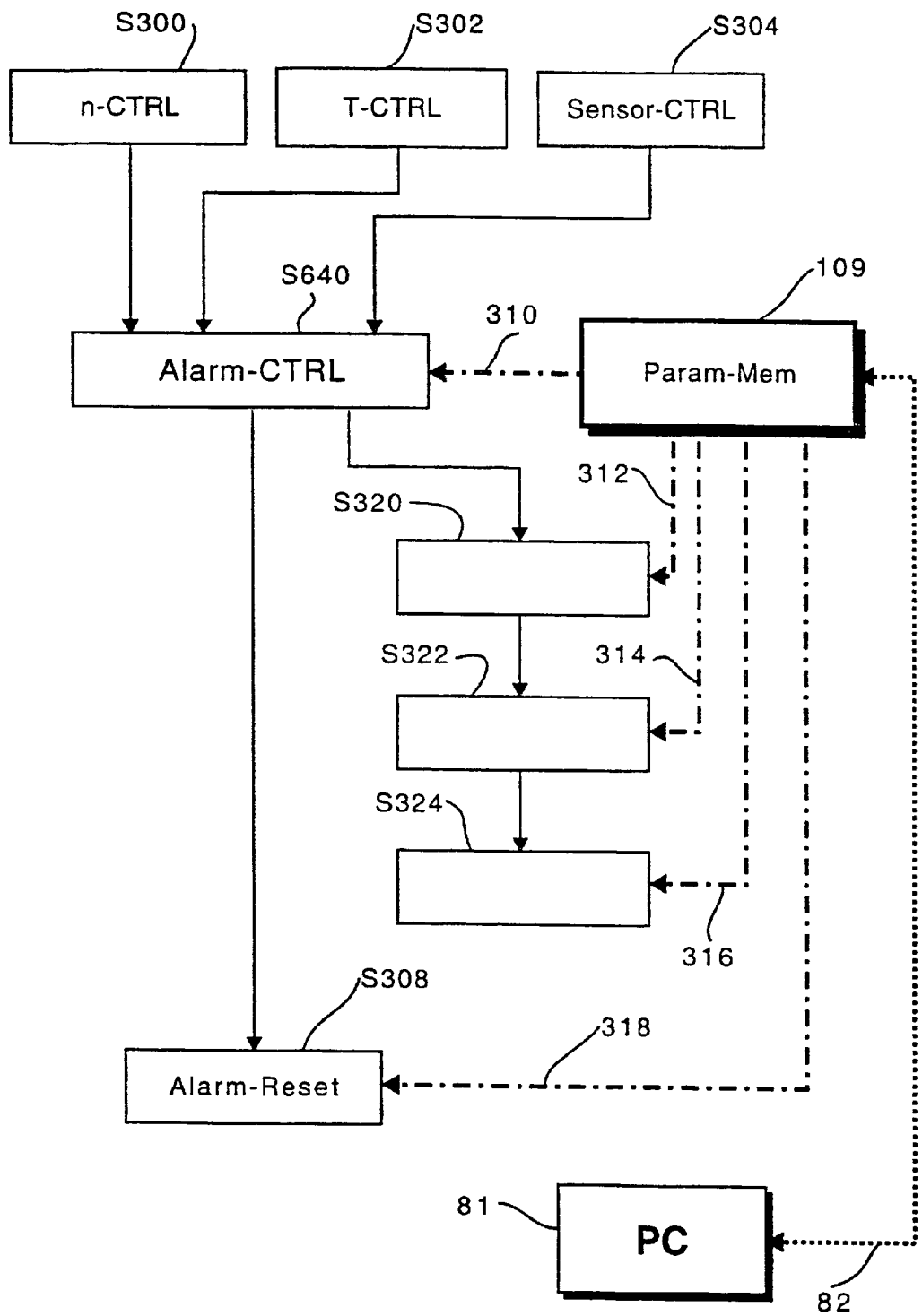
FIG. 4 is an overview flow chart of alarm functions 86 of FIG. 1 executing in µC 23 of FIG. 3.

FIG. 4 shows an overview of the configuration of alarm function 86 (FIG. 1).

Figure 11:
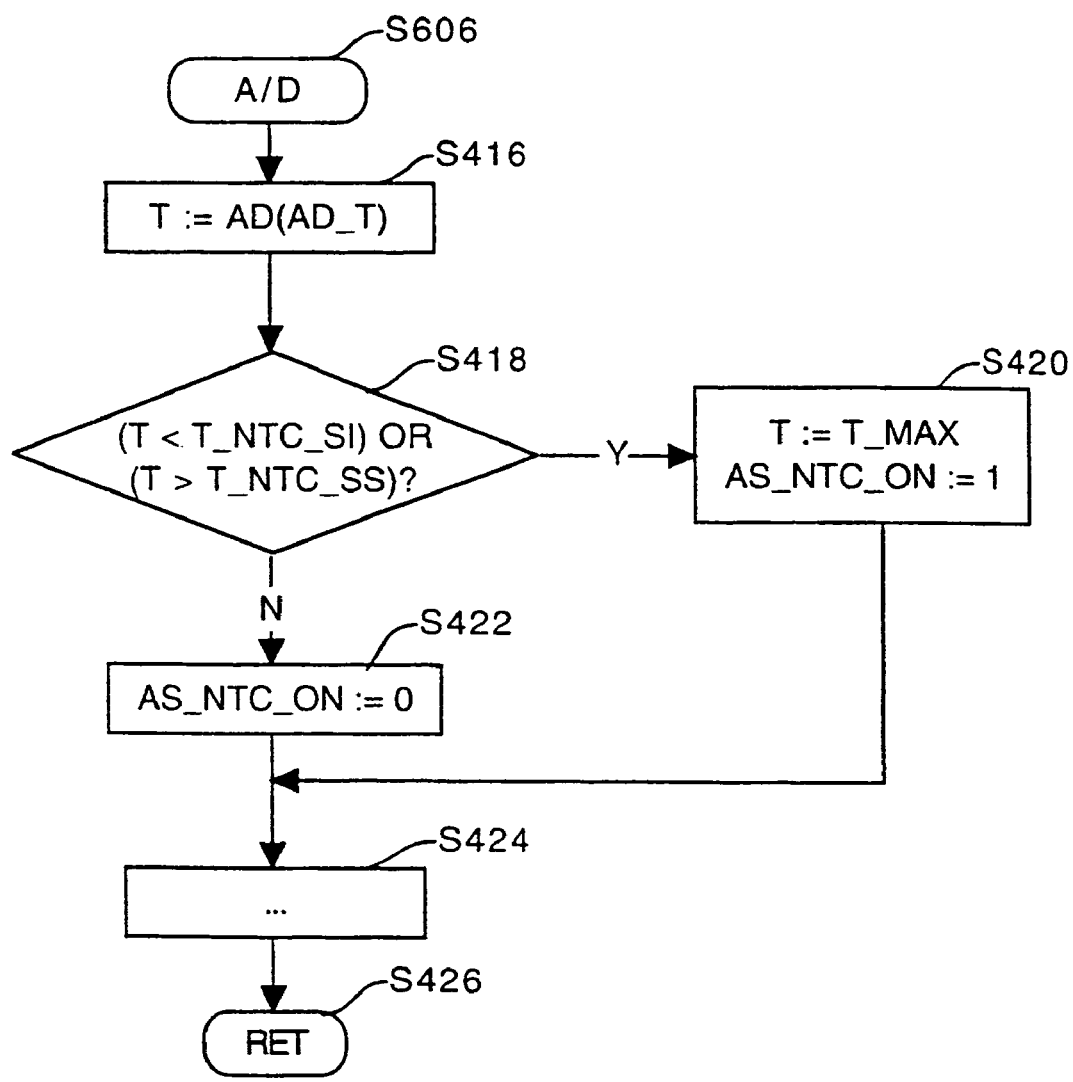
FIG. 11 is a flow chart of the "A/D" routine which serves to convert an analog value for temperature T into a digital value, to check that converted value for plausibility, and (upon the occurrence of implausible values) to diagnose an error.

Rotation speed n of motor 32 is monitored by rotation speed monitor (n-CTRL) S300, the temperature T (at NTC resistor 62) by a temperature monitor (T-CTRL) S302, and the functionality of NTC resistor 62 (FIG. 1) by a sensor monitor (Sensor-CTRL) S304 (cf. FIG. 11).

Figure 5:
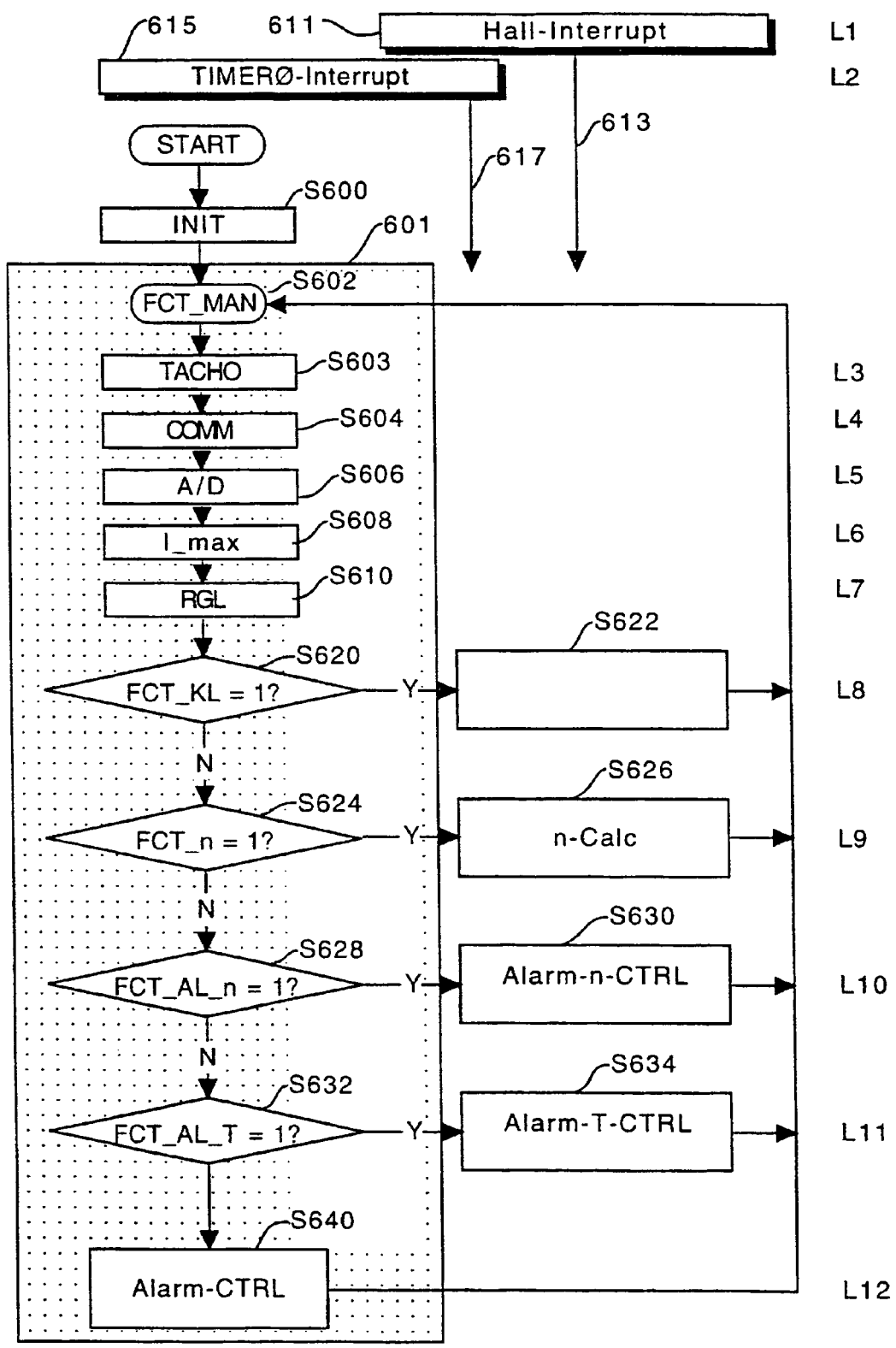
FIG. 5 shows a main program in the execution of a function manager that is preferably used in a motor according to the present invention.
Figure 14:
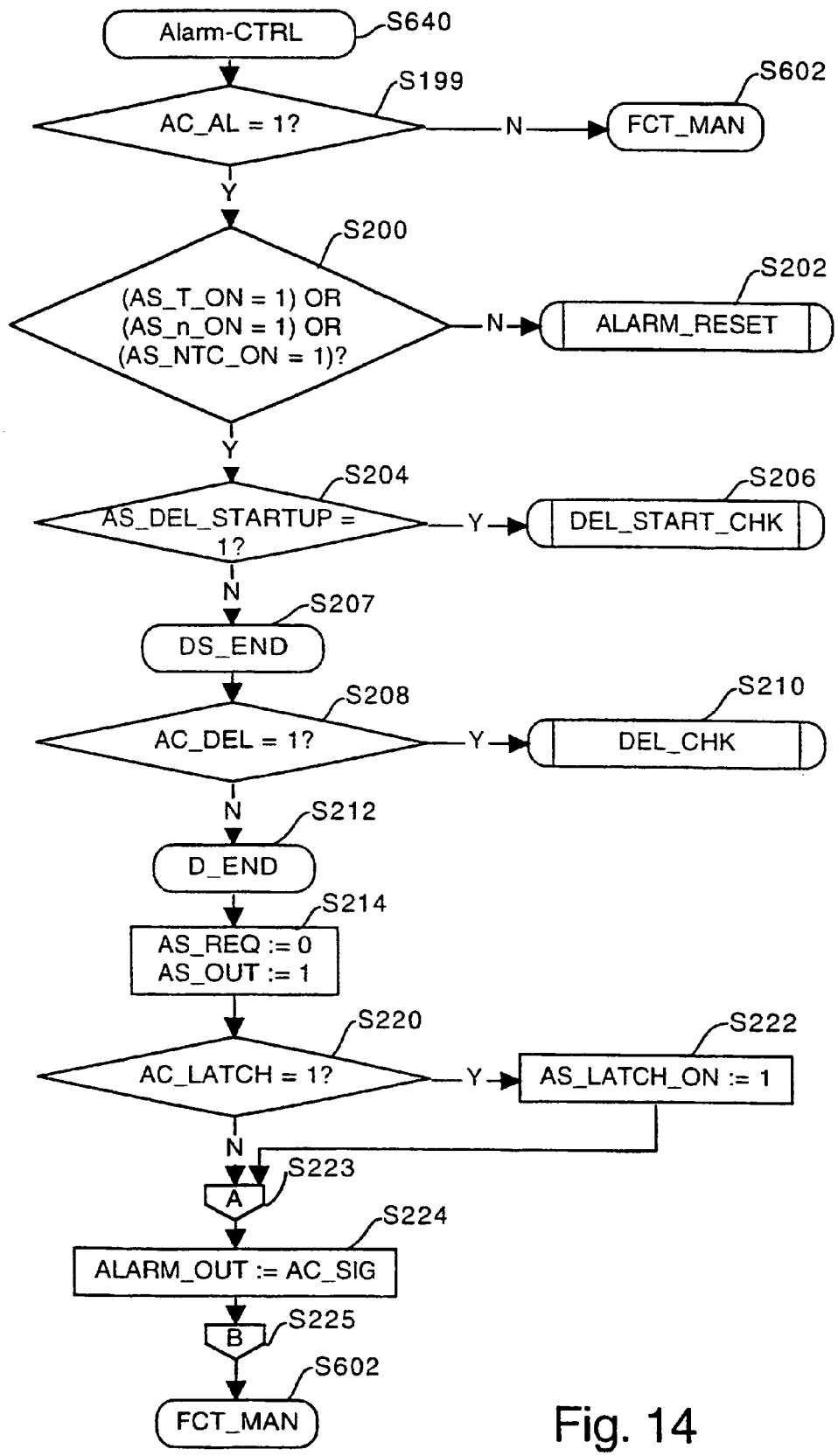
FIG. 14 is a flow chart of the "alarm control" function of FIG. 5, which serves to generate an alarm signal after diagnosis of an error if certain boundary conditions are met.

If an alarm state of motor 32 occurs in the context of any of the functions S300, S302, S304, it requests an alarm from an "alarm control" function (Alarm-CTRL) S640 (FIGS. 4, 5, 14). Once the alarm state of motor 32 has ended, the corresponding function S300, S302, or S304 resets the alarm state.

If an alarm is requested, first a "startup delay" function is performed at S320; the result of this is that an alarm cannot be triggered until motor 32 has already been running for a certain time, i.e. when it has reached its operating speed after being switched on.

In S322 an "alarm delay" function is then performed, introducing a delay between the request for an alarm from one of functions S300, S302, S304 and the triggering of that alarm. The result of this is that brief alarm requests do not cause an alarm. This prevents unnecessary alarms.

In the alarm output step S324, an alarm signal is finally output if the alarm request is still present even after the alarm delay (S322).

Once all the alarm requests are canceled, execution branches from "alarm control" function S640 to "alarm reset" function S308 (FIG. 4), where output of the alarm signal ends.

As a result of this structure, the individual monitoring routines S300, S302, S304 remain small and therefore require little memory space and calculation time, since they simply forward a request to "alarm control" function S640; and "alarm control" function S640 makes possible uniform processing of the alarm requests at a central location and with low priority. The "startup delay" function S320 and "alarm delay" function S322 prevent unnecessary false alarms.

As FIG. 4 schematically shows, the various routines can be influenced by parameters which are stored in a parameter memory (Param-Mem) 109 of any kind, and which can be delivered via data line 82 from a PC 81.

Some of these parameters can already have been stored in ROM 96 of $\mu$C 23 at its manufacture, to yield a kind of base configuration of the motor. Specific parameters can be stored in EEPROM 74 when motor 32 is switched off. Upon initialization (S600 in FIG. 5) the parameters are usually loaded from EEPROM 74 into RAM 97 of $\mu$C 23 in order to allow quick access to these parameters while motor 32 is in operation.

310 designates an effective connection with which the parameters in memory 109 influence the execution of "alarm control" routine S640.

312 designates an effective connection with which the parameters in memory 109 influence the execution of "startup delay" routine S320.

314 designates an effective connection with which the parameters in memory 109 influence the execution of "alarm delay" routine S322.

316 designates an effective connection with which the parameters in memory 109 influence the execution of "alarm output" routine S324.

Figure 15:
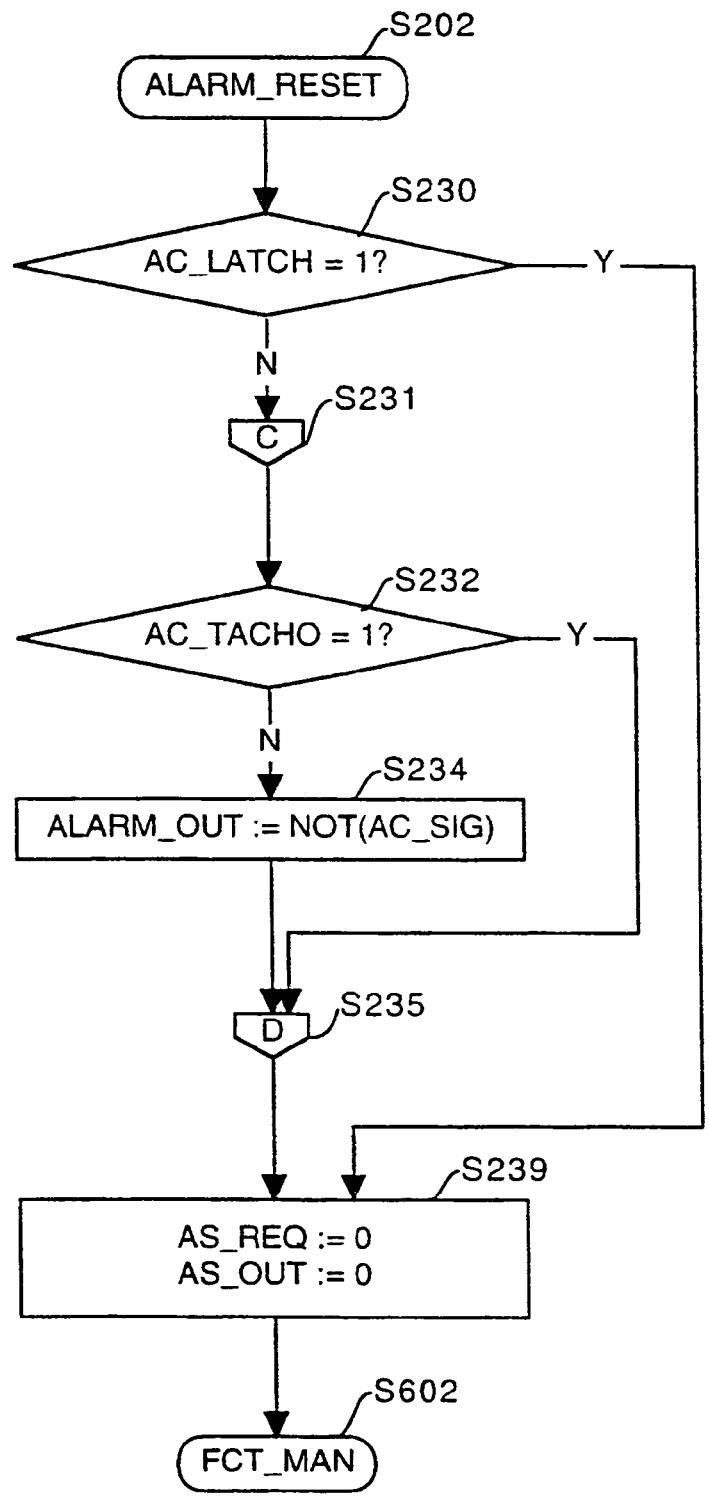
FIG. 15 is a flow chart of the "ALARM_RESET" portion of FIG. 14.

318 designates an effective connection with which the parameters in memory 109 influence the execution of "alarm reset" routine S308, which is depicted in detail in FIG. 15.

Since the program is preferably subdivided into short, manageable routines, execution of the latter can easily by modified by corresponding parameters; this means the program structure remains unchanged, and essentially the only data modified are those which influence program execution, for example the duration of the startup delay, the duration of the alarm delay, the type of alarm output, and the type of alarm reset, e.g. the decision as to whether and (optionally) how long an alarm is to remain stored.

All this will be explained in detail below by way of examples.

Function Manager (FIG. 5)

FIG. 5 shows a flow chart with one possible embodiment of the main program, in the form of a so-called function manager 601, executing in $\mu$C 23.

The tasks of the main program are to react to events such as, for example, a change in signal HALL; also to make resources, in particular calculation time, available to each function as necessary; and to observe priorities in assigning resources.

After motor 32 is switched on, an internal reset is triggered in $\mu$C 23. In S600, initialization of $\mu$C 23 is accomplished.

After initialization, execution branches into function manager 601, which begins in S602. The first functions executed are those that are time-critical and must be executed at each pass. These include the following routines: "TACHO" in S602, "COMM" in S604, "A/D" in S606, "I_max" in S608, and "RGL" in S610.

Routine S603 ("TACHO") allows signal HALL to be outputted at output ALARM_OUT 88 (FIG. 1). To allow a signal as identical as possible to signal HALL to be outputted at ALARM_OUT 88 (FIG. 1), the "TACHO" function is executed first. The "TACHO" routine is described in more detail below with reference to FIG. 10.

In the "COMM" function (S604), communication with bus terminal 80 via line 82 (FIG. 1) is monitored. At a baud rate of, for example, 2 K, bus 82 must be checked every 250 microseconds.

In S606, the "A/D" function is used to query A/D converter 60 (FIG. 1). The A/D converter digitizes the temperature at NTC resistor 62, which is present as a potential at node 66. In S608, an "I_max" motor current limiting routine that may be present (and is also time-critical) is executed.

The "RGL" function for controlling rotation speed n is called in S610.

Figure 6:
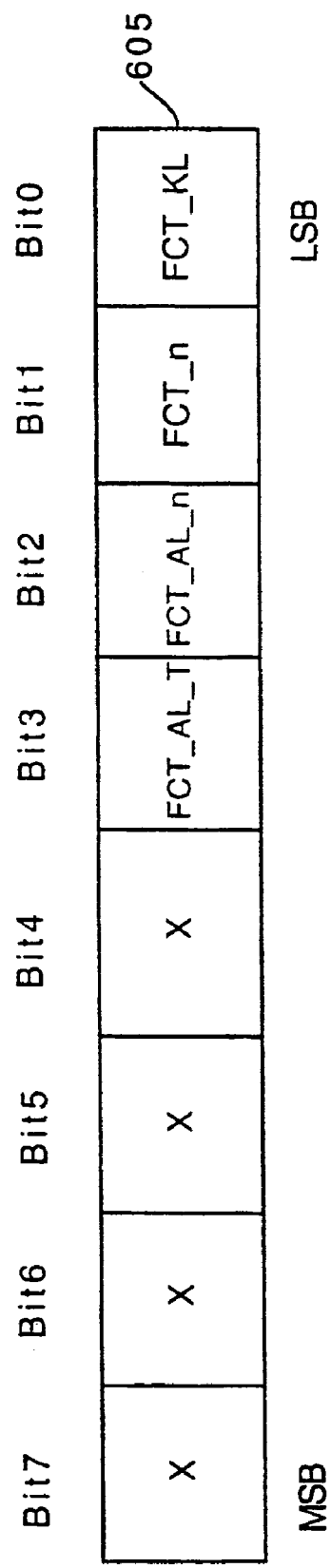
FIG. 6 depicts a control word having eight bits, which serve in the function manager (FIG. 5) to request the execution of functions or to reset those requests.

FIG. 6 shows an example of a function register 605 in which one bit is reserved for each of the functions in S622, S626, S630, and S634.

In this example, function register 605 is one byte long; and the following request bits are defined, beginning with the least significant bit (LSB), for the requestable functions explained below:

FCT_KL for the "characteristic" function;

FCT_n for the "rotation speed calculation" function;

FCT_AL_n for the "rotation speed alarm control" function;

FCT_AL_T for the "temperature alarm control" function.

The remaining bits are reserved for additional requestable functions that may be inserted as necessary into the function manager.

If a specific requestable function is requested by another function or an interrupt routine, the bit of the function to be requested is set to 1, e.g. FCT_AL_n :=1. If the function manager then, during the pass subsequent to that request, finds no other requestable function with a higher priority, the function is then called in S630 (FIG. 12), i.e. the rotation speed alarm control.

Figure 12:
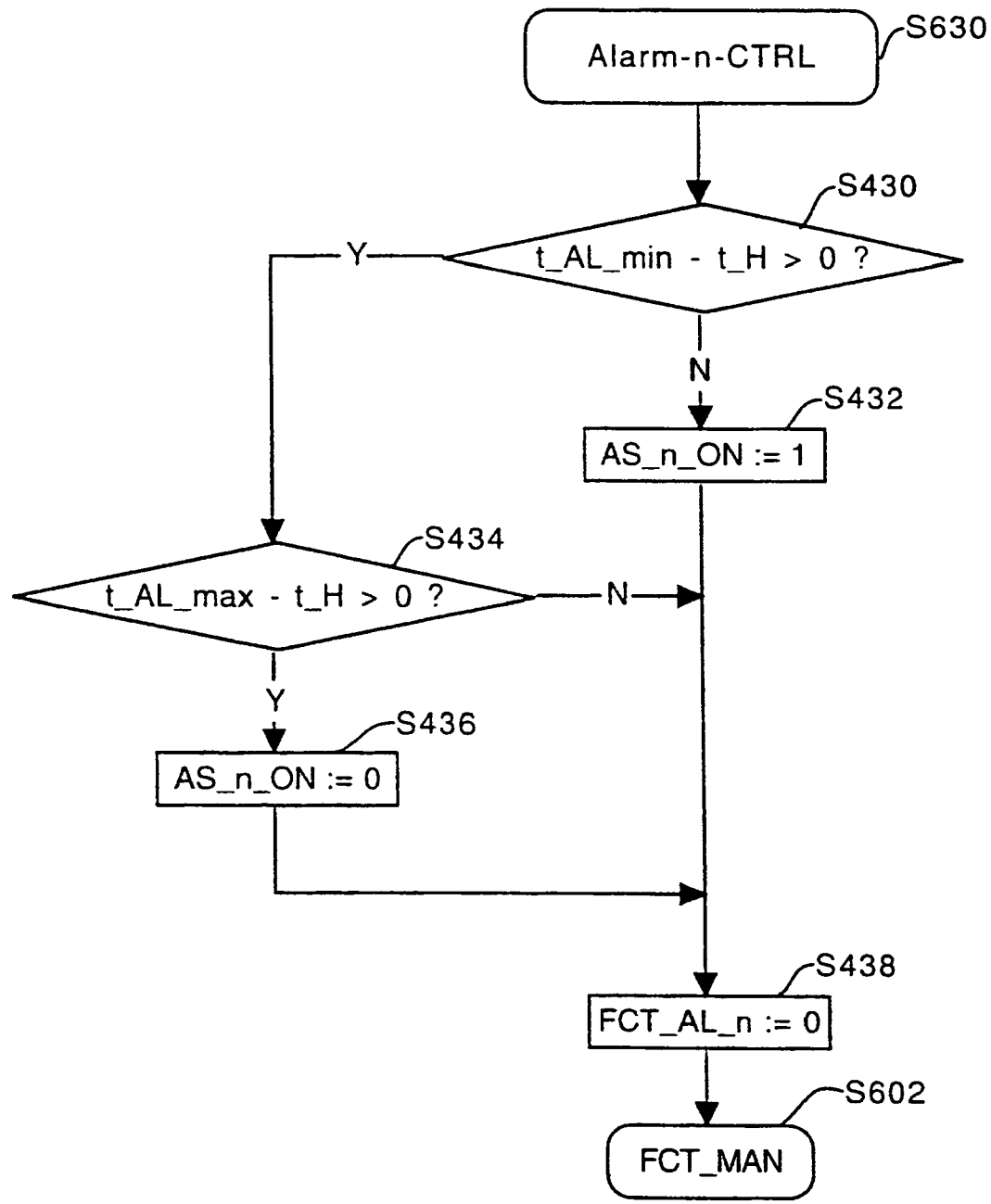
FIG. 12 is a flow chart of the "rotation speed alarm control" function of FIG. 5, which checks whether the rotation speed of the motor is within a predefined rotation speed range, and diagnoses an error upon excursion beyond that range.

When a requested function has been executed, it resets its bit in function register 605 back to 0, e.g. FCT_AL_n :=0 in S438 of FIG. 12.

Once the requestable function has been executed, the program branches back to S602 at the beginning (FCT_MAN) of function manager 601.

After S610 in FIG. 5, a check is made in a predetermined sequence, beginning with the most important requestable function, as to whether its request bit is set. If so, the requested function is executed. The higher up such a function is located in function manager 601, the higher its priority.

S620 checks whether request bit FCT_KL is set. If it is set, the "characteristic" function is called in S622. The purpose of this is to allocate to a specific temperature T, which was measured with NTC resistor 62, a specific rotation speed setpoint n_s of motor 32. For example, a temperature of 20° C. could have a rotation speed of 1500 rpm allocated to it.

If FCT_n is set in S624, then the "rotation speed calculation" function (n-Calc) is called in S626. The reader is referred in this connection to equations (2) through (4), which can be implemented with this function.

If FCT_AL_n is set in S628, the "rotation speed alarm control" function (Alarm-n-CTRL) is called in S630. This is described in more detail below with reference to FIG. 12. At its termination, FCT_AL_n is reset to zero in S438.

If FCT_AL_T is set in S632, the "temperature alarm control" function (Alarm-T-CTRL) is called in S634. This is described in more detail below with reference to FIG. 13. At its termination, FCT_AL_T is reset to zero in S458.

If none of the request bits of function register 605 were set, an "alarm control" routine (Alarm-CTRL) is performed in S640, and execution branches back to S602. The "alarm control" routine is described below with reference to FIG. 14, and a variant with reference to FIG. 19.

Figure 21:
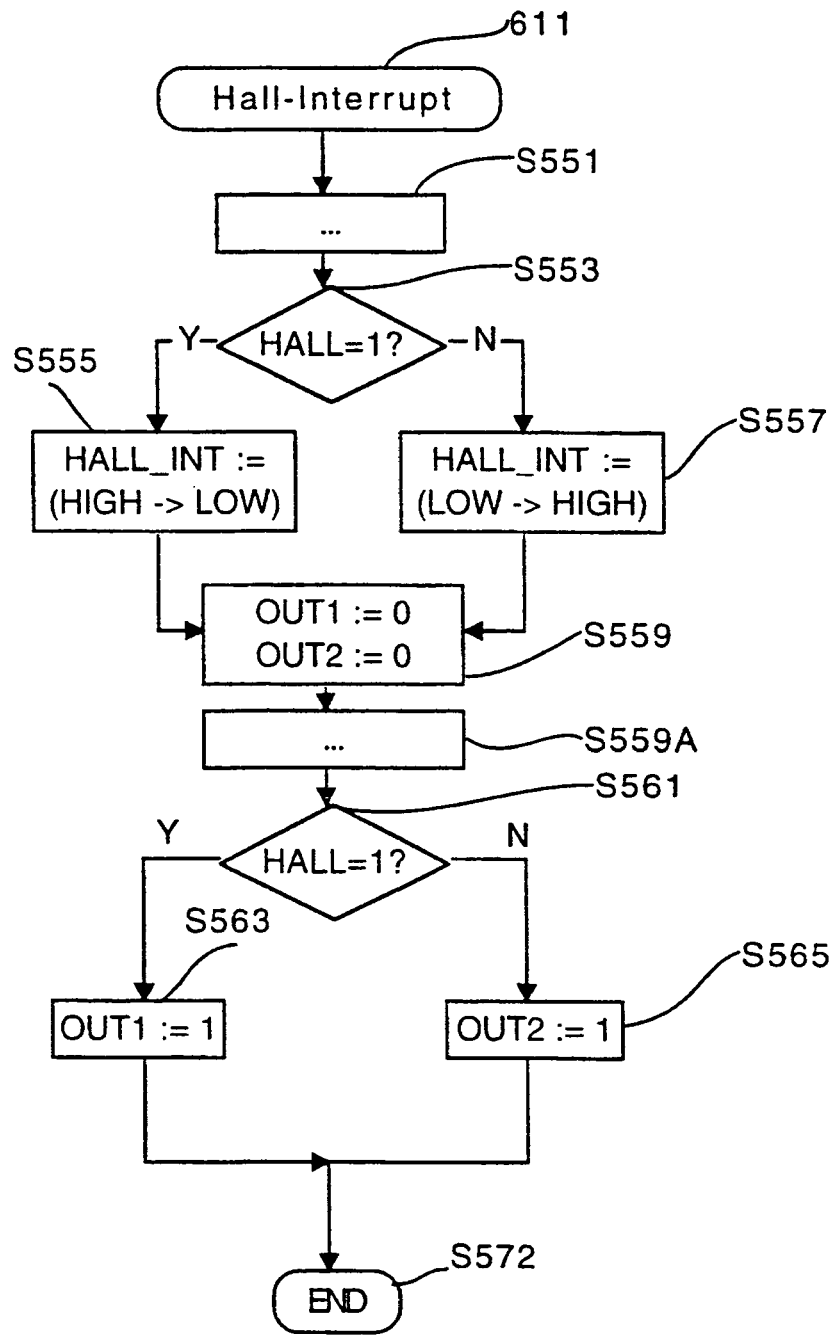
FIG. 21 is a flow chart of Hall interrupt 611 indicated in FIG. 5, which serves inter alia to control or influence the commutation of motor 32.

FIG. 5 symbolically shows a Hall interrupt 611 that has the highest priority L1 (level 1). It interrupts all processes of function manager 601, as symbolized by arrow 613, in order to achieve precise commutation of motor 32. The flow chart of Hall interrupt 611 is depicted in FIG. 21 by way of example.

A TIMER0 interrupt of timer 98 (FIG. 1) is depicted below Hall interrupt 611 at 615. This has a lower priority (L2) and interrupts all processes below it, as indicated by arrow 617.

If Hall interrupt 611 and timer interrupt 615 were requested simultaneously, they would be processed in the order of their priority.

The subsequent functions have progressively lower priorities, from L3 for the "TACHO" function in S603 to L12 for the "alarm control" routine in S640.

It is possible in this fashion to categorize the various "needs" of motor 32 in a predefined hierarchy, and to use the resources of µC 23 optimally for the operation of motor 32. "Alarm control" function (Alarm-CTRL) S640 is not time-critical, and can therefore have a low priority. It could alternatively be configured as a requestable function.

Object Table (FIG. 7A)

FIG. 7A shows an object table 111 with objects (data words) which contain alarm configuration parameters for motor 32. The objects comprise an index, a memory type (column 113), access rights (column 115), and a name (column 117). Object table 111 is stored in EEPROM 74, and its contents can be modified via bus 82 in order to change the configuration of motor 32.

The index is shown in hexadecimal form, a "0x" in front of a number always indicating "hexadecimal." Memory type 113 is either "unsigned16," i.e. two bytes with no sign, or "unsigned8," i.e. one byte with no sign. Access rights 115 are R (read)/W (write), i.e. the objects can be read and modified. Names 117 of the objects are provided for ease of use:

AL_CONF Alarm configuration word (cf. FIG. 7B)
t_AL_min Lower rotation speed alarm limit (absolute Hall time)
t_AL_max Upper rotation speed alarm limit (absolute Hall time)
t_AL_REL_min Lower relative rotation speed alarm limit
t_AL_REL_max Upper relative rotation speed alarm limit
t_DEL_STARTUP Startup delay time for alarm
t_DEL_AL Delay time for alarm
T_AL Alarm temperature
T_AL_HYST Hysteresis value for alarm temperature
T_NTC_SI Temperature limit for interrupted connection to sensor
T_NTC_SS Temperature limit for sensor short circuit Object table 111 can be expanded arbitrarily by adding objects.

Figure 16:
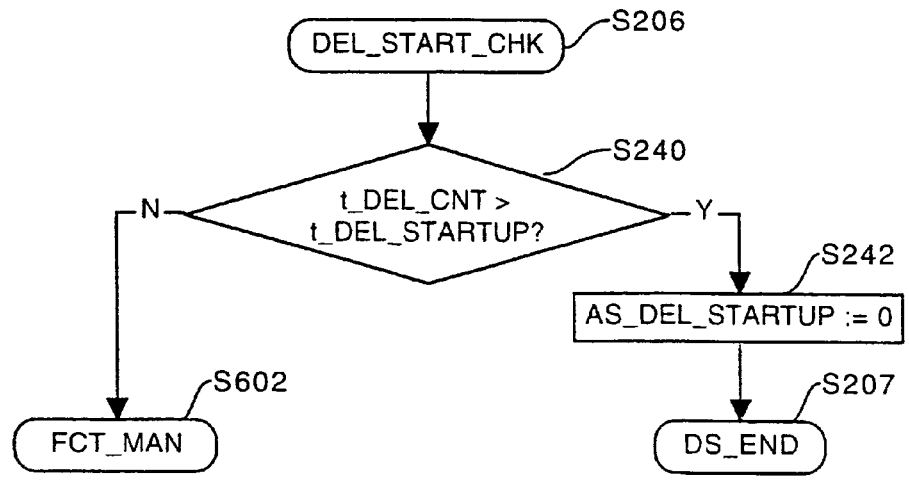
FIG. 16 is a flow chart of the "DEL_START_CHK" portion of FIG. 14.

The t_DEL_STARTUP time is to be distinguished from the t_DEL_START time which is used in FIG. 16 for the alarm delay, and which represents a variable within the program.

Object table 111 is stored in a nonvolatile memory, in this exemplary embodiment in EEPROM 74 (FIG. 1). After each reset of µC 23, upon initialization in S600 (FIG. 5) object table 111 is transferred from EEPROM 74, via "CTRL EEPROM" function 72, into RAM 97 of µC 23, and is thereupon available in the program executing in µC 23 (FIG. 5). For dependable operation of motor 32, it may be advantageous to repeat this initialization cyclically at specific time intervals.

Modification of the objects in object table (in EEPROM 74), and thus a change in the alarm configuration, is accomplished via bus terminal 80, "COMM" function 78, and "CTRL EEPROM" function 71. Alarm configuration (in EEPROM 74) is performed by the manufacturer in accordance with the customer's wishes, or the customer acquires the capability of modifying them himself.

The open structure of object table 111 makes it possible to add new objects using a standardized procedure.

FIG. 7B explains in more detail the object having the name AL_CONF (alarm configuration) and index 0x08. The object has the memory type (column 113 in FIG. 7A) unsigned16, and is thus 16 bits long. The bits are consecutively numbered from 0 through 15 in FIG. 7B. The name of each bit is listed in column 119, and the LOW and HIGH columns indicate what the respective state means for that bit.

AK_AL indicates whether the "alarm" function is (HIGH) or is not (LOW) to be activated at all.

AK_LATCH on HIGH means that an alarm is to be stored until it is reset by an external event such as, for example, an instruction via bus terminal 80. LOW, on the other hand, means that the alarm is reset immediately after the reason for the alarm becomes inapplicable, and then is no longer stored.

AK_DEL_STARTUP sets whether an alarm delay is (HIGH) or is not (LOW) to take place upon startup of the motor. If AK_DEL_STARTUP=HIGH, the alarm is activated only after the time indicated in object t_DEL_STARTUP.

AK_DEL sets whether an alarm is to be triggered immediately after occurrence of an alarm request (LOW), or whether a delay time (indicated in object t_DEL_AL object) is to be observed before triggering the alarm.

AK_TTL sets whether, in the event of an error, a signal is to be outputted via a TTL line. This can be, for example, output ALARM_OUT 88.

If AK_SIG is LOW, then in the event of an alarm F, output ALARM_OUT 88 (FIG. 1) is set to LOW; if no alarm is present, ALARM_OUT 88 is HIGH. If AK_SIG=HIGH, the result is exactly the opposite. AK_SIG thus makes it possible to select the logic signal that is to be generated at output ALARM_OUT 88. This is explained in more detail below with reference to FIGS. 19 and 20.

AK_TACHO determines whether a tacho signal (described with reference to FIG. 10) is to be outputted via output ALARM_OUT 88 if no alarm is present.

AK_IIC can be used to define whether, in the event of an error, a datum is to be output via an IIC bus. This can be done via "COMM" function 78 on bus 82, which is configured as an IIC bus (FIG. 1).

AK_NTC defines whether an alarm will (HIGH) or will not (LOW) be triggered in the event of an interruption in the connection to the sensor, i.e. a defect in the NTC resistor.

AK_n defines whether rotation speed monitoring should (HIGH) or should not (LOW) take place.

AK_T can be used to define whether temperature monitoring should (HIGH) or should not (LOW) take place.

If AK_n_PERC is HIGH, the values of objects t_AL_REL_min and t_AL_REL_max (FIG. 7A) are used as relative rotation speed alarm limits. The rotation speed alarm limit is then calculated as a percentage of the rotation speed setpoint. If, on the other hand, AK_n_PERC is LOW, then objects t_AL_min and t_AL_max (FIG. 7A) are used as absolute rotation speed limits.

AK_n_min/AK_n_max determines whether the lower/upper rotation speed limit is (HIGH) or is not (LOW) to be used.

Bits 14 and 15 are not used in this exemplary embodiment, and are reserved for further configurations.

Control Word (FIG. 8) and Status Word (FIG. 9)

FIG. 8 shows a control word AL_CTRL and FIG. 9 a status word AL_STATE. In contrast to the objects of FIGS. 7A and 7B, these are normally present only in RAM 97 of μC 23, and serve to bring about a data exchange between the operating system (FIG. 5) and the individual alarm functions.

After a reset of μC 23, control word AL_CTRL of FIG. 8 is filled (in S600) with the relevant values from object AL_CONF (FIGS. 7A, 7B). The names of the bits are indicated in column 121 in FIG. 8.

Status word AL_STATE (FIG. 9) is also initialized in S600. It contains the relevant instantaneous storage status of an alarm (AS_LATCH_ON), the tacho signal (AS_TACHO_ON), the sensor interrupt alarm (AS_NTC_ON), the temperature alarm (AS_T_ON), the rotation speed alarm (AS_n_ON), the alarm delay (AS_REQ), and the output (AS_OUT) from output ALARM_OUT 88 (FIG. 1). Bit 7 is unused (reserved) in this exemplary embodiment. The names of the relevant bits are listed in column 123 of FIG. 9.

Figure 10:
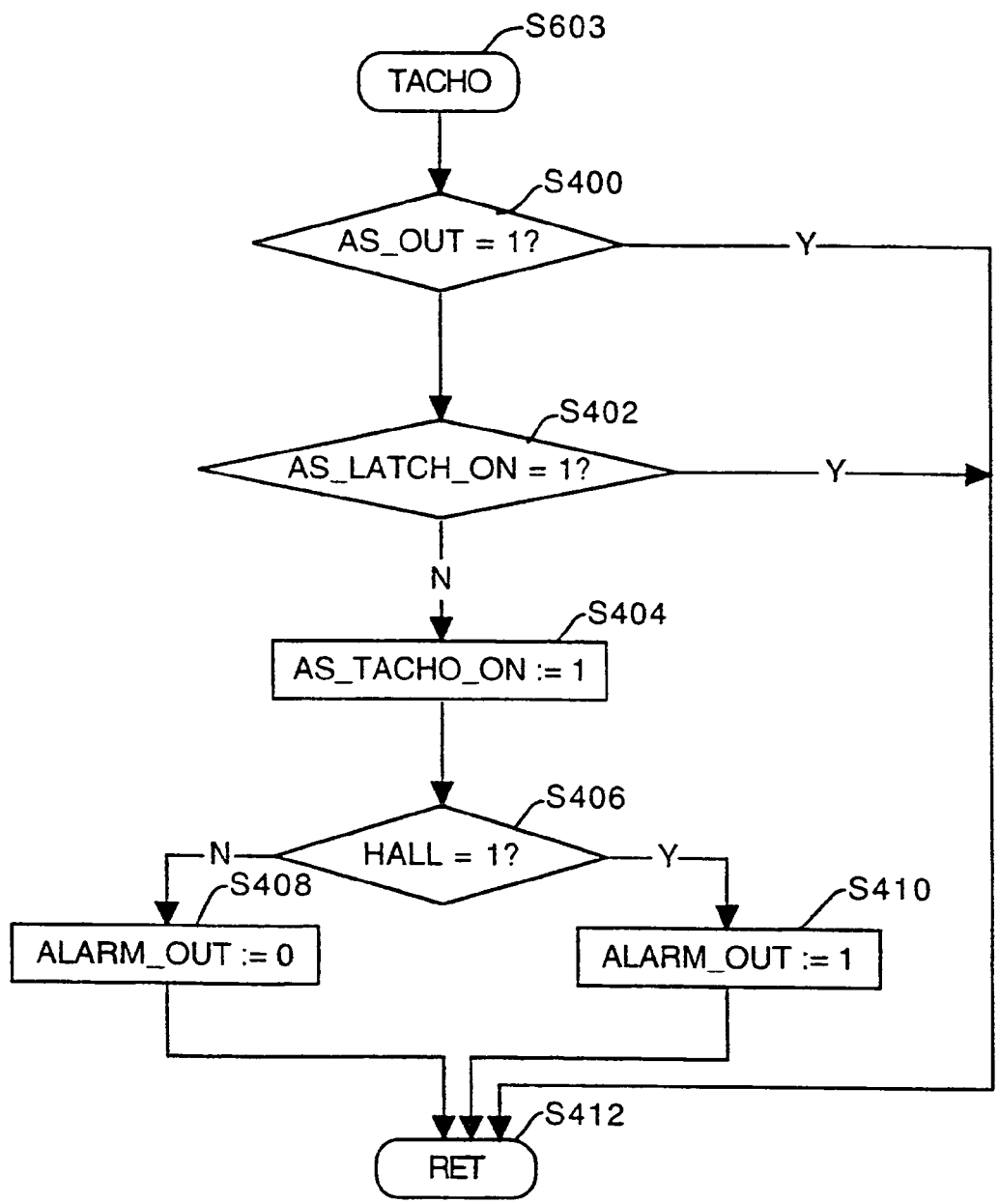
FIG. 10 is a flow chart of the "TACHO" function (routine) of FIG. 5.

FIG. 10 shows the "TACHO" function (S603 in FIG. 5) which in normal operation, i.e. when no alarm has been triggered, outputs at output ALARM_OUT 88 a signal corresponding to signal HALL (FIGS. 1, 3), i.e. pulses at a frequency that depends on the motor rotation speed.

S400 checks, on the basis of status word bit AS_OUT, whether an alarm signal is currently being outputted. If AS_OUT=1, execution immediately leaves the "TACHO" function by branching to S412, since the alarm must not be overwritten.

S402 checks whether the alarm is to be stored until it is reset by an external signal. If status word bit AS_LATCH_ON= 1, execution therefore branches to the end (S412).

In S404, status word bit AS_TACHO_ON is set to 1. This indicates that a tacho signal is being outputted.

S406 checks whether signal HALL (FIG. 3) is presently 0 or 1, and output ALARM_OUT 88 is accordingly set to 0 in S408 or to 1 in S410. In S412, execution branches back from the "TACHO" function. The result is to produce at output 88 (FIG. 1) pulses that substantially correspond to signal HALL.

FIG. 11 shows a flow chart with a portion of the "A/D" function S606 (FIG. 6).

In S416 the potential at input 57 of A/D converter 60 (FIG. 1) is read in using the instruction AD(AD_T) and stored in T. The value T corresponds to an instantaneous temperature at NTC resistor 62, for example 84 degrees C.

S418 checks whether a sensor interruption or short circuit exists.

A sensor interruption exists when the connection to NTC resistor 62 is interrupted at point 62a or 62b (FIG. 1). In such a case the value for T is lower than a sensor breakdown value T_NTC_SI (FIG. 7A), since resistor 62 has an apparent value of infinity, which would correspond to a very low temperature.

A sensor short circuit exists when a short circuit has occurred between points 62a and 62b. In such a case the value of T is greater than a sensor short-circuit value T_NTC_SS (FIG. 7A), since resistor 62 has an apparent value of zero, which would correspond to a very high temperature.

If a sensor interruption or sensor short circuit exists, execution branches to S420. Since the actual temperature in these two cases is unknown, T is set to a temperature constant T_MAX which corresponds to a high temperature, and an alarm is requested by setting AS_NTC_ON to 1.

If no sensor breakdown or sensor short circuit is found in S418, AS_NTC_ON is set to 0 in S422 and execution moves on to S424.

Further steps (e.g. calling a "characteristic" function) may follow in S424, and the "A/D" routine ends at S426.

FIG. 12 shows an exemplary embodiment of the "rotation speed alarm" (Alarm-n-CTRL) function S630 of FIG. 5. This is called when bit FCT_AL_n of the function register (FIG. 6) is set, which preferably occurs at a defined time interval after a new calculation of the Hall time t_H (FIG. 3).

In S430 a comparison is made to determine whether the instantaneous Hall time t_H is less than the lower rotation speed limit in the form of Hall time t_AL_min (FIG. 7A). If not, motor 32 is too slow, and status word bit AS_n_ON is set to 1 in S432, thus requesting a rotation speed alarm (which is triggered in FIG. 14, S200). If t_H was less than t_AL_min, then motor 32 is fast enough and execution branches to S434.

S434 checks, on the basis of an upper rotation speed limit in the form of Hall time t_AL_max (FIG. 7A), whether the motor rotation speed is above this upper limit. Only if that is so is status word bit AS_n_ON set back to 0 in S436. This implements a hysteresis which prevents the rotation speed alarm request from being continuously set and canceled again.

In S438, FCT_AL_n (FIG. 6) is set back to 0, since the "rotation speed alarm control" function is completely executed.

Figure 13:
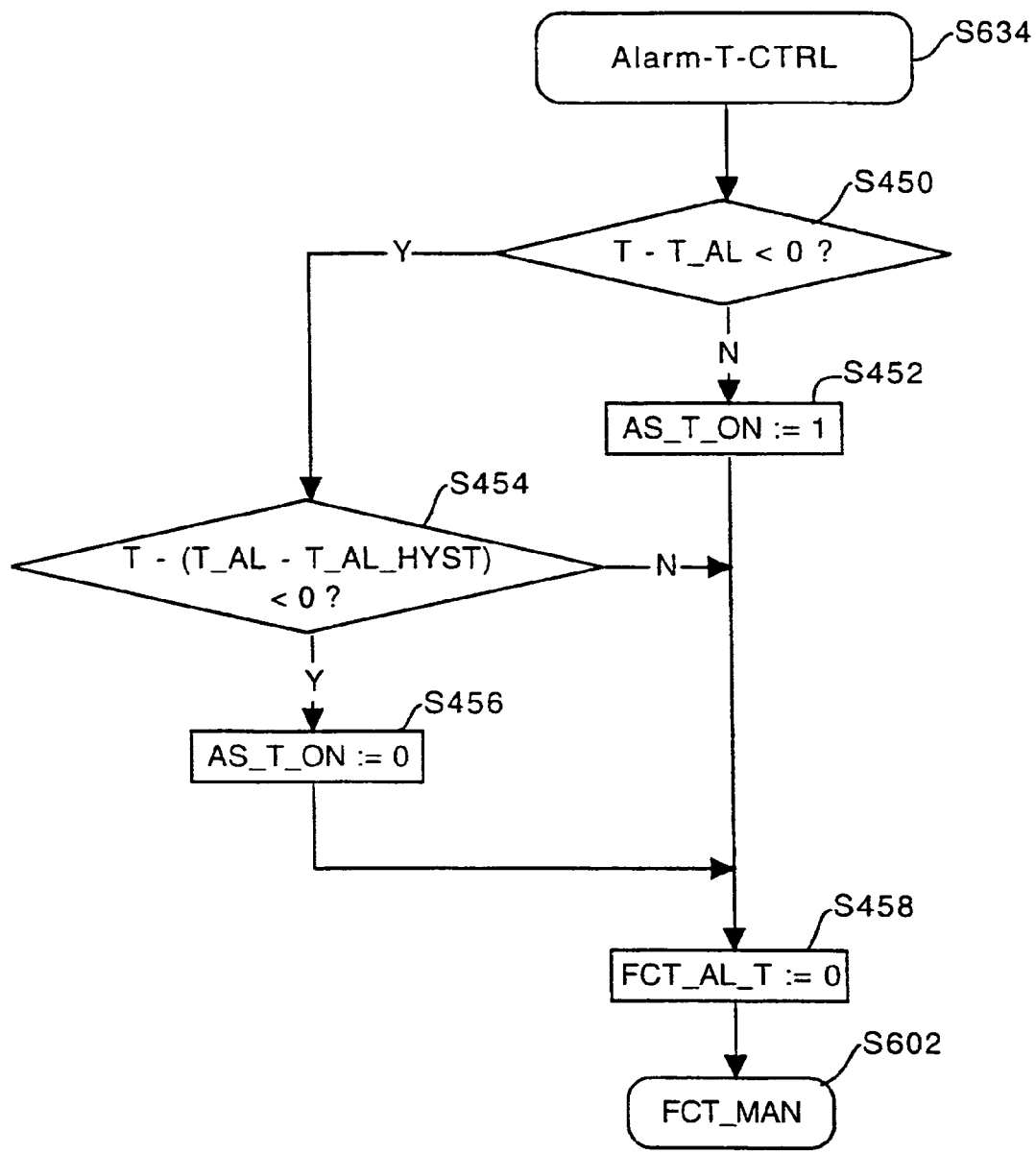
FIG. 13 is a flow chart of the "temperature alarm control" function of FIG. 5, which serves to monitor whether a predefined temperature limit is being observed, and upon nonobservance to diagnose an error.

FIG. 13 shows an exemplary embodiment of the "temperature alarm control" (Alarm-T-CTRL) function S634 of FIG. 5. After each determination of the temperature in "A/D" function S606, function register bit FCT_AL_T (FIG. 6) is set to 1. When function manager 601 reaches step S632, "temperature alarm control" function S634 as shown in FIG. 13 is called.

S450 checks whether temperature T at NTC resistor 62 (FIG. 1) is lower than alarm temperature T_AL (FIG. 7A). If not, temperature T is too high, and a temperature alarm is requested by setting AS_T_ON to 1 in S452. This request is processed in FIG. 14, S200.

If T<T_AL, then in S454 (by analogy with FIG. 12) a hysteresis is introduced. If the value of T is also lower than the value (T_AL−T_AL_HYST)−T_AL_HYST (FIG. 7A) corresponding, for example, to a temperature difference of 3° Kelvin—the temperature alarm request is reset by setting AS_T_ON to 0 in S456; otherwise execution branches directly to S458.

In S458, FCT_AL_T is set to 0, since the function is completely executed. Execution then branches in FIG. 5 back to the beginning of the function manager (FCT_MAN) at S602.

An alarm is thus requested if temperature T becomes greater than temperature T_AL, and the alarm request is reset when the temperature once again becomes less than (T_AL−T_AL_HYST).

FIGS. 14 through 17 show an exemplary embodiment of the "alarm control" function (S640 in FIGS. 4 and 5).

S199 in FIG. 14 checks whether AC_AL=1 (FIG. 8). If not, the "alarm" function is deactivated and execution immediately branches back to FCT_MAN S602 (FIG. 5). Otherwise execution branches to S200.

In S200, AS_T_ON, AS_n_ON, and AS_NTC_ON (FIG. 9) are used to check whether an alarm has been requested. If no alarm has been requested, execution branches to ALARM_RESET S202. The routine in S202 is depicted in FIG. 15.

If an alarm was requested in S200, S204 then checks, on the basis of status word bit AS_DEL_STARTUP, whether the startup delay is active. If so, execution jumps to S206 and the routine of FIG. 16 is performed in order to monitor the startup time. Status word bit AS_DEL_STARTUP is set to 1 in the INIT step (S600) if control word bit AC_DEL_STARTUP=1 (FIG. 8). If AC_DEL_STARTUP=0, however, AS_DEL_STARTUP is also set to 0, and no startup delay takes place. After the startup time has elapsed, AS_DEL_STARTUP is set to zero (i.e. deactivated) in FIG. 16, S242.

S207 is a branching label DS_END to which execution branches from step S242 in FIG. 16.

Figure 17:
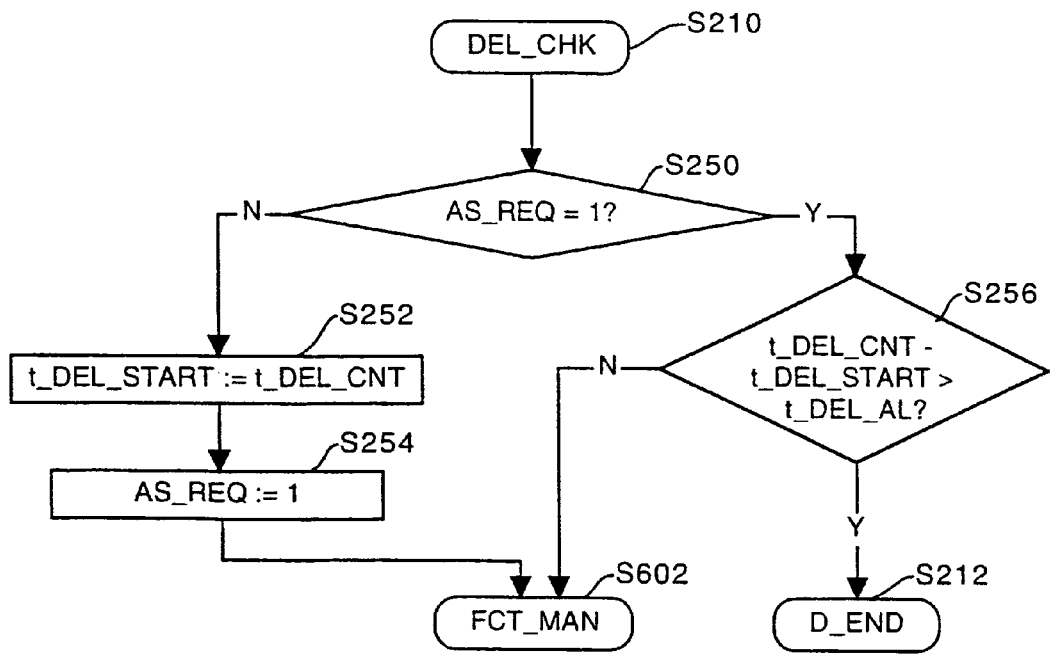
FIG. 17 is a flow chart of the "DEL_CHK" portion of FIG. 14.

S208 checks, on the basis of control word AC_DEL (FIG. 8), whether an alarm delay (cf. S322 in FIG. 4) is to be performed in steps S210 and the subsequent steps in FIG. 17.

S212 is a branching label D_END to which execution branches from the program section shown in FIG. 17 (S256 in FIG. 17).

In S214, AS_REQ (FIG. 9) is set to 0 so that at the next pass an alarm delay once again takes place; and status word bit AS_OUT (FIG. 9) is set to 1, since the alarm signal will subsequently be outputted.

S220 checks, on the basis of control word bit AC_LATCH (FIG. 8), whether the alarm is to be stored. If so, status word bit AS_LATCH_ON (FIG. 9) is set to 1 in S222; otherwise execution branches directly to S223.

Figure 19:
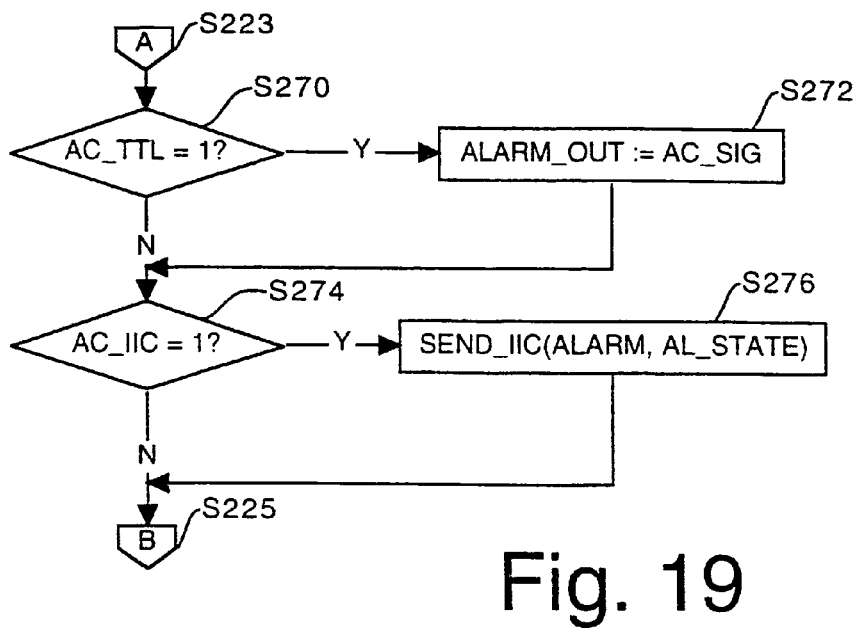
FIG. 19 is a flow chart for parameter-controlled output of the alarm signal at various alarm outputs.

Nodes A 223 and B 225 each point toward a possible extension that is depicted in FIG. 19.

Lastly, in S224 output ALARM_OUT 88 (FIG. 1) is set to the alarm edge (high or low) defined by control word bit AC_SIG (FIG. 8). AC_SIG thus determines the type of output signal desired by the customer for controlling his equipment. Execution then branches back to FCT_MAN S602 (FIG. 5).

FIG. 15 shows the ALARM_RESET program section (S202) of the "alarm control" function S640 (FIG. 14), which is executed if no alarm is requested.

S230 checks, on the basis of control word bit AC_LATCH (FIG. 8), whether any existing alarm that may have been triggered is to be stored. If so, execution then branches directly to S239.

Figure 20:
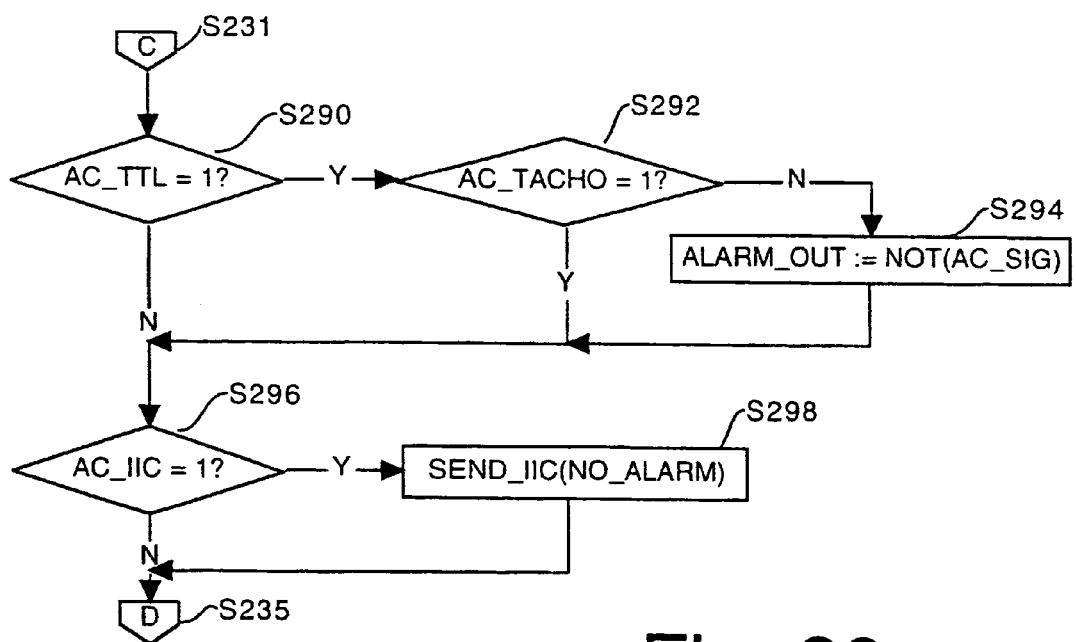
FIG. 20 is a flow chart for resetting the alarm outputs activated in accordance with FIG. 19.

Nodes C S231 and D S235 point toward a possible extension that is depicted in FIG. 20.

Otherwise S232 checks, on the basis of control word bit AC_TACHO, whether a tacho signal is to be outputted at output ALARM_OUT 88 (FIG. 1). If so, the tacho signal must not be overwritten here, and execution again branches to S239.

If not, in S234 output ALARM_OUT 88 is set to the edge opposite to the edge defined by AC_SIG. For example, if AC_SIG= 1 (HIGH), ALARM_OUT is then set to 0 (LOW), thereby storing an alarm signal.

In S239, control word bit AS_REQ (FIG. 9) is set to 0 so that an alarm delay once again takes place at the next alarm; and control word bit AS_OUT (FIG. 9) is also set to 0, since at present no alarm is being triggered.

Execution then branches to the beginning (FCT_MAN, S602) of function manager 601 (FIG. 5).

FIG. 16 shows a program section for the startup delay, which is branched to in the "alarm control" function from S204 (FIG. 14).

A counter t_DEL_CNT, which is incremented e.g. every 0.5 s by means of a timer, e.g. TIMER0 98, is used for the alarm delay both at startup and when an alarm is requested. In this exemplary embodiment, counter t_DEL_CNT is initialized with 0 in the INIT step (S600) that is executed after each reset of motor 32.

S240 checks whether counter t_DEL_CNT is greater than the startup delay time t_DEL_STARTUP. If so, then motor 32, for example given a value t_DEL_STARTUP=60, has already been in operation longer than 30 seconds, and in S242 status word bit AS_DEL_STARTUP (in RAM 97) is set to 0 because the startup delay has ended.

From S242 execution branches to DS_END S207 (cf. FIG. 14, middle), and the alarm delay is then performed.

If t_DEL_CNT<t_DEL_STARTUP, execution branches back to FCT_MAN (S602), since the startup time has not yet elapsed and consequently an alarm must not be triggered.

FIG. 17 shows a program section which implements the alarm delay. If, in S208 (FIG. 14), control word bit AC_DEL= 1 (FIG. 8), i.e. if the alarm delay is switched on, execution then branches to the DEL_CHK label (S210).

In S250 status word bit AS_REQ (FIG. 9) is checked. If it has a value of 0, a new alarm request has occurred and the delay time has not yet been started. Execution branches to S252.

In S252 the value of counter t_DEL_CNT (described with reference to FIG. 16) is stored in t_DEL_START as the starting value of the delay time, and in S254 AS_REQ (FIG. 9) is set to 1 to indicate that the alarm delay has begun.

If the alarm delay had already begun in S250 (AS_REQ= 1), S256 then checks whether (t_DEL_CNT−t_DEL_START), i.e. the time since the alarm request began, is greater than the alarm delay time defined in t_DEL_AL (FIG. 7A) upon configuration of the motor.

If so, execution branches to D_END S212 (FIG. 14), and an alarm is triggered at S224. If not, execution branches to FCT_MAN S602, and an alarm is not yet triggered.

FIG. 18 explains the mode of operation using an example. FIG. 18A shows the operating voltage $U_B$ that is switched on at time t1. FIG. 18B shows an example of a curve for rotation speed n of motor 32. FIG. 18C shows signal ALARM_OUT 88 as a function of rotation speed n from FIG. 18B.

Switching on operating voltage $U_B$ causes a power-up reset of $\mu C$ 23 to be triggered, and counter t_DEL_CNT (FIGS. 16 and 17) is initialized with 0.

At time t1 the motor has not yet reached lower rotation speed alarm limit n AL_min, so the "rotation speed alarm control" function (FIG. 12) requests an alarm in S232.

In this example, rotation speed indications n_AL_min and n_AL_max are used instead of Hall times t_AL_min and t_AL_max or t_AL_REL_min and t_AL_REL_max (FIG. 7A). The conversion between Hall time t_H and rotation speed n is explained in FIG. 3.

At time t2, counter t_DEL_CNT reaches the value of t_DEL_STARTUP defined by the configuration (FIGS. 7A and 16), and since in this example the alarm delay was activated upon configuration (AC_DEL=1), the alarm delay DEL_CHK S210 (FIG. 17) is called from S208.

At time t3, the alarm delay t_DEL_AL (FIG. 7A) that was defined upon configuration of the motor has also elapsed, i.e. a time t_DEL_AL has passed since time t2.

In "alarm control" function S640 (FIGS. 5, 14), an alarm is then triggered in S224. AC_SIG has a value of 1 in this example, so output ALARM_OUT 88 (FIG. 1) is set to HIGH.

At time t4, rotation speed n rises above upper rotation speed alarm limit n_AL_max. "Rotation speed alarm control" function S630 (FIG. 12) then, in S236, resets alarm request AS_n_ON back to 0, and in "alarm control" function S640 (FIG. 14), in step S200 execution branches to ALARM_RESET S202 (FIG. 15). There, because in this example the alarm is not stored (AC_LATCH=0) and no tacho signal is being outputted (AC_TACHO=0), in step 234 output ALARM_OUT 88 is set back to 0.

At time t5, rotation speed n again drops below lower rotation speed limit n_AL_min, and in S232 the "rotation speed alarm control" function S630 (FIG. 12) requests an alarm (AS_n_ON: =1). Since the startup delay is already concluded (AS_DEL_STARTUP=0), in S208 of FIG. 14 execution branches to DEL_CHK S210 (FIG. 17), and in S252 thereof the starting value of delay counter t_DEL_CNT is stored in t_DEL_START.

Not until time t6 (FIG. 18C) is the value (t_DEL_CNT−t_DEL_START) greater than alarm delay time t_DEL_AL defined by the configuration, so that at this time (as at time t3), an alarm is again triggered by setting ALARM_OUT 88 to HIGH (cf. FIG. 18C).

At time t7, rotation speed n once again rises above upper rotation speed limit n_AL_max. In "rotation speed alarm control" function S630 (FIGS. 5, 12), the alarm request is then reset (AS_n_ON: =0) in S236; and in "alarm reset" function S202 (FIGS. 4, 15), output ALARM_OUT is set back to 0 in S234.

Since the objects listed in object table 111 (FIG. 7A) can be selected without restriction upon configuration of motor 32—for example, startup delay t_DEL_STARTUP, alarm delay t_DEL_AL, alarm temperature t_AL, the various alarm rotation speeds, and lastly the configuration word as shown in FIG. 7B with its numerous possibilities—the result is an enormous number of variations in the way motor 32 can be configured via bus 82 with no need make any changes to its hardware. These possibilities are symbolically indicated in FIG. 4 by lines 310, 312, 314, 316, and 318.

FIG. 19 shows a flow chart that permits various ways of outputting an alarm. Steps S270 through S276 here replace step S224 of the "alarm control" function of FIG. 14. Nodes A S223 and B S225 correspond to the nodes in FIG. 14.

If an alarm is to be triggered, S270 of FIG. 19 checks whether control word bit AC_TTL=1 (FIG. 8). If so, in S272 an alarm is outputted via line ALARM_OUT 88; otherwise execution branches directly to S274.

S274 checks whether AC_IIC=1 (cf. FIG. 8). If so, an alarm then needs to be outputted via IIC bus 82 (FIG. 1). This is done by calling, in S276, the "SEND_IIC" function, which outputs an alarm and the status word AL_STATE (FIG. 9) onto IIC bus 82.

FIG. 20 shows the resetting of the alarm signal corresponding to the setting of the alarm signal in FIG. 19. Steps S290 through S298 here replace steps S232 and S234 of the "ALARM_RESET" function of FIG. 15. Nodes C S231 and D S235 correspond to the nodes in FIG. 15.

In S290, control word bit AC_TTL (FIG. 8) is used to check whether an alarm is being outputted via ALARM_OUT 88 (FIG. 1). If so, S292 checks whether AC_TACHO (FIG. 8) is equal to 1. If so, output ALARM_OUT 88 is controlled by the "TACHO" function (FIG. 10); if not, in S294 (as in S234 of FIG. 15), output ALARM_OUT 88 is reset again.

S296 checks whether AC_IIC=1. If so, in S298 the "SEND_IIC" function outputs onto IIC bus 82 the information that an alarm no longer exists.

The variants shown in FIGS. 19 and 20 allow the alarm output to be selected, and it can be controlled by way of objects (of FIG. 8). The alarm output can be configured by modifying bits AK_TTL and AK_IIC in object AL_CONF (FIG. 7B).

FIG. 21 shows the presently relevant sections of a Hall interrupt routine 611 (FIG. 5) which is called upon occurrence of a Hall interrupt (611 in FIG. 3). A Hall interrupt is triggered at each change in signal HALL (FIG. 3) from HIGH to LOW and from LOW to HIGH, i.e., in the example of FIG. 3, at times t=0, 2.5, 5, 7.5, and 10 ms.

S551 designates general steps that involve the calculation of HALL time t_H (FIG. 3), for example stopping a corresponding timer, etc.

In steps S553, S555, and S557 the edge of signal HALL at which the next Hall interrupt is to be triggered is set in $\mu C$ 23. For this purpose, S553 checks whether HALL=1. If YES, in S555 the edge at which the next Hall interrupt is to be triggered is set to a trailing edge (HIGH−>LOW). If not, in S557 the trigger is set to a rising edge (LOW−>HIGH).

In S559 OUT1 and OUT2 are set to zero, i.e. motor 32 is made currentless. The purpose of this is briefly to interrupt H-bridge 112 so that a short circuit cannot occur in it during a commutation.

A variety of steps can be performed in S559A, for example restarting a counter (not depicted) for measuring t_H. These program steps should last, for example, 50 microseconds.

In S561 through S565, commutation is performed. If HALL= 1 in S561, then in S563 OUT1 is set to 1; OUT2 remains at 0 (cf. S559). If HALL=0 in S561, then in S565 OUT2 is set to 1; OUT1 remains at 0 (cf. S559).

Signal OUT1=1 causes transistors 114 and 118 to be activated, as already described, and signal OUT2=1 causes transistors 116 and 120 to be activated.

Following steps S563 or S565, routine 611 ends at S572. Signals OUT1 and OUT2 remain stored until they are modified by the program.

Optionally, commutation can also take place slightly earlier than the respective Hall interrupt, somewhat in the manner of an ignition advance in a motor vehicle. In the case of electric motors this is referred to commutation advance.

Of course many further additions and modifications are possible in the context of the present invention, as will be clearly evident to one skilled in the art from the description above. For example, in many cases it may be useful to provide password protection so that certain parameters can be modified only by the manufacturer.

What is claimed is:

1. A method of configuring an alarm indicator of an electronically commutated motor (ECM) having an input interface (80, 82), an electronic parameter memory (74; 109), and a microprocessor (23), comprising the steps of:
   inputting, via said input interface, at least one parameter (111) for configuring said alarm indicator;
   storing said at least one parameter (111) in said parameter memory (74; 109);
   executing, in said microprocessor, a routine associated with said alarm indicator, in a manner influenced by the value of said stored parameter; and
   also performing steps for controlling the electronic commutation of said motor under control by the microprocessor.

2. The method of claim 1, wherein
   said storing step comprises storing said parameter in a non-volatile memory.

3. The method of claim 1, further comprising:
   providing a plurality of routines, adapted to be executed by said microprocessor, which routines each trigger an alarm when a respective predefined alarm condition arises; and
   inputting, via said input interface, a plurality of parameters, in order to influence the execution of at least one of said routines.

4. The method of claim 3, wherein said input interface (80, 82) is operable bidirectionally, and further comprising the step of
   indicating at least one of said alarm conditions by sending an output signal via said interface (80, 82).

5. The method according to claim 4, further comprising applying at least one of said alarm output signals for triggering an internal reset of the microprocessor.

6. The method of claim 3, further comprising
   providing a plurality of alternative ways to generate an alarm indication, and
   defining a preferred way of generating said alarm indication by storing, via said interface, a corresponding parameter in said parameter memory (74; 109).

7. The method of claim 3, further comprising the steps of
   providing a plurality of output devices,
   inputting, via said interface, an output device selection parameter, and
   directing any alarm output signal generated, to an output device, out of that plurality of output devices, designated by said output drive selection parameter.

8. The method according to claim 3, further comprising using a parameter inputted to select between activation and deactivation of an alarm indicator in a routine associated with said microprocessor.

9. The method of claim 1, wherein said motor comprises an output device (88) responsive to application of an alarm signal (ALARM_OUT), and said method comprises the steps of
   providing a routine, adapted for execution by said microprocessor, for controlling said output devices, and
   inputting a parameter to influence said routine and to thereby configure said output device in accordance with said parameter.

10. The method according to claim 1, further comprising monitoring rotation speed of said motor, and
    triggering an alarm if the motor rotation speed falls below a specific value.

11. The method according to claim 10, further comprising performing said rotation speed monitoring with hysteresis, namely clearing an alarm state only when the motor rotation speed reaches a value that is greater than the motor rotation speed below whose value the alarm was triggered.

12. The method according to claim 10, further comprising defining at least one rotation speed limit of the rotation speed monitor by inputting at least one corresponding parameter via the input interface.

13. The method according to claim 1, further comprising defining a motor temperature limit,
    monitoring temperature of said motor, and
    triggering a temperature alarm when said temperature limit is exceeded.

14. The method according to claim 13, further comprising performing said temperature monitoring with hysteresis, namely clearing an alarm state only when a temperature is reached that is lower than the temperature at which the alarm was triggered.

15. The method according to claim 13, further comprising defining said temperature limit of said monitoring step by inputting at least one corresponding parameter via the input interface.

16. The method of claim 1, further comprising inputting, via the input interface, at least one data word as a parameter.

17. The method according to claim 16, further comprising using a data word, comprising a rotation speed value, for monitoring of motor rotation speed.

18. The method according to claim 16, further comprising using a data word, comprising a temperature value, for monitoring motor temperature.

19. The method according to claim 16, further comprising using a data word, comprising sensor information, for monitoring a sensor (62) associated with the motor.

20. The method according to claim 19, wherein said sensor monitoring comprises monitoring operation of a Negative Temperature Coefficient (NTC) resistor (62).

21. The method according to claim 1, further comprising, when no alarm is present, outputting a tachometer signal instead of an alarm signal.

22. The method according to claim 1, further comprising determining which type of alarm indication, if any, is generated by referring to a stored parameter.

23. The method according to claim 1, further comprising using a TTL output to indicate whether an alarm has been triggered, and
previously selecting, by inputting a parameter, that HIGH is output in the case of error and that LOW is output in case of no error.

24. The method according to claim 1, further comprising using a TTL output to indicate whether an alarm has been triggered, and
previously selecting, by inputting a parameter, that LOW is output in the case of error and HIGH is output in case of no error.

25. A method of configuring an alarm indicator of a microprocessor-controlled electric motor having an input interface (80, 82) and an electronic parameter memory (74; 109), comprising the steps of:
defining a delay period after motor power-on, within which no alarm signal is to be generated,
inputting, via said input interface, at least one parameter (111) for configuring said alarm indicator;
measuring time elapsed since motor power-on, and
suppressing generation of an alarm signal until said delay period has elapsed;
storing said at least one parameter (111) in said parameter memory (74; 109); and
executing, in said microprocessor, a routine associated with said alarm indicator, in a manner influenced by the value of said stored parameter.

26. The method according to claim 25, further comprising inputting a duration parameter via the input interface, and
using said duration parameter as an operating value for the length of said delay period.

27. A method of configuring an alarm indicator of a microprocessor-controlled electric motor having an input interface (80, 82) and an electronic parameter memory (74; 109), comprising the steps of:
inputting, via said input interface, at least one parameter (111) for configuring said alarm indicator;
storing said at least one parameter (111) in said parameter memory (74; 109);
executing, in said microprocessor, a routine associated with said alarm indicator, in a manner influenced by the value of said stored parameter;
setting an alarm delay, during which triggering of an alarm is suppressed after the occurrence of an alarm condition, and
triggering an alarm if and only if the alarm condition continues to exist after said alarm delay has elapsed.

28. The method according to claim 27, wherein
said alarm delay setting comprises
inputting a corresponding parameter via the input interface.

29. A Method of operating an electronically commutated motor having associated with it a microprocessor (23), and a nonvolatile memory (74) for storing at least one parameter, the microprocessor serving to execute a plurality of routines of differing priorities, comprising the following steps:
a) executing a diagnostic routine serving for error detection, and, upon detection of an error, setting an error signal associated with said error;
b) at time intervals, checking whether said error signal is set, by means of an alarm monitoring routine (FIGS. 5 and 14: S640);
c) when said error signal is set, generating an alarm signal in accordance with said error signal and with said at least one parameter (111) which is stored in the nonvolatile memory (74).

30. The method according to claim 29, further comprising executing said alarm monitoring routine (S640) when no other routine having a higher priority is present at the moment (FIG. 5).

31. The method according to claim 29, further comprising, when inputting a parameter for the motor (32), the step of
loading into the nonvolatile memory (74) at least one parameter for influencing execution of said alarm monitoring routine (S640).

32. The method according to claim 29, further comprising, prior to executing said alarm monitoring routine, the step of
transferring said at least one parameter from said nonvolatile memory (74) into a volatile memory (97) associated with the microprocessor (23) and addressable thereby.

33. The method according to claim 29, further comprising the steps of:
storing, in at least one register of the nonvolatile memory (74), at least one parameter for at least one of a diagnostic routine and an alarm monitoring routine (S640); and
executing a routine in accordance with a value of said stored parameter associated therewith.

34. The method according to claim 33, further comprising, prior to said routine-executing step, the step of transferring at least one stored parameter, from said nonvolatile memory (74), into a volatile memory (97) associated with the microprocessor and addressable thereby.

35. The method according to claim 34, wherein said transferring into the volatile memory (97) is performed when activating the motor (32).

36. The method according to claim 34, further comprising transferring at least one parameter into the volatile memory (97) upon each reset operation of the microprocessor (32).

37. The method according to claim 29, further comprising storing in the nonvolatile memory (74) at least one parameter (AK_LATCH) which controls whether or not an alarm signal is to be stored.

38. The method according to claim 29, further comprising configuring routines of different priorities at least partially as routines which are requestable by means of a request signal, and, after each execution of a requested routine, executing a sequence of program steps necessary for operation of the motor before the next requested routine or the alarm monitoring routine (S640) begins.

39. The method according to claim 38, wherein the sequence of program steps necessary for operation of the motor comprises
a routine for polling an interface associated with the motor.

40. An electric motor comprising
a microprocessor (23) for controlling motor operation, in accordance with a program executed by the microprocessor,
at least one diagnostic routine adapted for sensing an error occurring during operation of the motor and at least one alarm monitoring routine adapted for triggering an alarm after said diagnostic routine has sensed an error;

said routines constituting part of said program executed by said microprocessor (23).

41. The electric motor according to claim 40, further comprising a nonvolatile memory (74), associated with the microprocessor, for storing at least one respective parameter for at least one of said diagnostic routines and for said alarm monitoring routine (S640).

42. The electric motor according to claim 41, further comprising an input and a data bus (82) for transferring at least one parameter from said input to the nonvolatile memory (74).

43. The electric motor according to claim 41, wherein said at least one respective parameter includes a parameter for controlling whether, after elimination of a alarm condition which caused an alarm signal, a record of said alarm condition is to be stored.

44. The electric motor according to claim 41, wherein the at least one parameter controls which type of signal is outputted in the event of an error.

45. An electric motor comprising a microprocessor for controlling motor operation, in accordance with a program executed by the microprocessor, at least one diagnostic routine adapted for sensing an error occurring during operation of the motor and at least one alarm monitoring routine adapted for triggering an alarm after said diagnostic routine has sensed an error;

said routines constituting part of said program executed by said microprocessor;

a nonvolatile memory, associated with the microprocessor, for storing at least one respective parameter for at least one of said diagnostic routines and for said alarm monitoring routine; and wherein the at least one parameter sets a length of time after activation of the motor, during which generation of an alarm signal is suppressed.

46. An electric motor comprising a microprocessor for controlling motor operation, in accordance with a program executed by the microprocessor, at least one diagnostic routine adapted for sensing an error occurring during operation of the motor and at least one alarm monitoring routine adapted for triggering an alarm after said diagnostic routine has sensed an error;

said routines constituting part of said program executed by said microprocessor;

a nonvolatile memory, associated with the microprocessor, for storing at least one respective parameter for at least one of said diagnostic routines and for said alarm monitoring routine, wherein the at least one parameter sets a length of time, during which, after occurrence of an error, generation of an alarm signal is suppressed.

* * * * *